United States Patent
LaChapelle

(10) Patent No.: US 12,470,295 B1
(45) Date of Patent: Nov. 11, 2025

(54) ENHANCED OPTICAL SIGNAL COMMUNICATION VIA HOLLOW CORE FIBERS

(71) Applicant: Joseph Gerard LaChapelle, Austin, TX (US)

(72) Inventor: Joseph Gerard LaChapelle, Austin, TX (US)

( * ) Notice: Subject to any disclaimer, the term of this patent is extended or adjusted under 35 U.S.C. 154(b) by 0 days.

(21) Appl. No.: 18/974,068

(22) Filed: Dec. 9, 2024

Related U.S. Application Data

(63) Continuation of application No. 18/764,093, filed on Jul. 3, 2024, now Pat. No. 12,218,705.

(60) Provisional application No. 63/644,600, filed on May 9, 2024.

(51) Int. Cl.
| | |
|---|---|
| *H04B 10/2537* | (2013.01) |
| *H01S 3/067* | (2006.01) |
| *H01S 3/30* | (2006.01) |
| *H04B 10/291* | (2013.01) |
| *H04B 10/50* | (2013.01) |

(52) U.S. Cl.
CPC ..... *H04B 10/2537* (2013.01); *H01S 3/06729* (2013.01); *H01S 3/302* (2013.01); *H04B 10/505* (2013.01)

(58) Field of Classification Search
CPC .......................... H04B 10/291; H04B 10/2916
See application file for complete search history.

(56) References Cited

U.S. PATENT DOCUMENTS

| | | | |
|---|---|---|---|
| 6,452,716 B1 * | 9/2002 | Park | H04B 10/2916 359/334 |
| 8,681,421 B1 | 3/2014 | Pepper et al. | |
| 10,992,374 B1 * | 4/2021 | Miedema | H04B 10/0777 |
| 11,121,797 B1 * | 9/2021 | Akasaka | H04B 10/2916 |
| 11,212,005 B1 * | 12/2021 | Jopson | H04B 10/2581 |
| 2012/0213473 A1 | 8/2012 | Sasho et al. | |

(Continued)

FOREIGN PATENT DOCUMENTS

WO  WO/2023/084708  5/2023

OTHER PUBLICATIONS

F. Couny et al., Sub-Watt Threshold CW Raman Fiber-Gas-Laser Based on H2-Filled Hollow-Core Photonic Crystal Fiber, 2008 Conference on Lasers and Electro-Optics and 2008 Conference on Quantum Electronics and Laser Science, May 4-9, 2008, San Jose, CA, USA. 2 pages. Publisher:IEEE; ISBN:978-1-55752-859-9.

(Continued)

*Primary Examiner* — Shi K Li
(74) *Attorney, Agent, or Firm* — Ronit Buller

(57) ABSTRACT

Disclosed herein are methods, devices, apparatuses, and non-transitory computer readable media for signal communication via hollow fiber using stimulated Raman scattering (HC-SRS). Such use of HC-SRS can cause amplification of the signal as it is transmitted through the hollow fiber. Such use of HC-SRS may have (A) reduced signal loss during transmission, (B) reduced latency time as compared to optical signal propagating through a solid core optical fiber, (C) increase a distance between repeaters required for signal transmission, or (D) any combination of (A) (B) and (C); with any of (A) and (C) being compared to any of the currently used signal transmission methodologies disclosed herein.

30 Claims, 10 Drawing Sheets

(56) References Cited

U.S. PATENT DOCUMENTS

| | | | | |
|---|---|---|---|---|
| 2012/0219301 A1* | 8/2012 | Koch, III | ............... | H04B 10/25 |
| | | | | 398/142 |
| 2023/0236086 A1* | 7/2023 | Pei | ....................... | G01M 11/319 |
| | | | | 702/189 |
| 2024/0072506 A1* | 2/2024 | Larochelle | ............ | H01S 3/1608 |
| 2024/0092024 A1 | 3/2024 | Buller et al. | | |
| 2024/0333391 A1* | 10/2024 | Nakano | .................. | H04B 10/60 |

OTHER PUBLICATIONS

K. Borzycki et al., Hollow-Core Optical Fibers for Telecommunications and Data Transmission, Appl. Sci. Sep. 26, 2023, vol. 13 No. 19, 10699, 45 pages, Publisher: MDPI.

E. N. Fokoua et al., Loss in hollow-core optical fibers: mechanisms, scaling rules, and limits, Jan. 20, 2023, vol. 15, No. 1, Advances in Optics and Photonics. 85 pages. Publisher: Optica Publishing Group.

A Lumenisity White Paper: CoreSmart® Hollowcore Cable Solutions, Published Nov. 2021 10 pages. Publisher: Semantic Scholar; Corpus ID: 260697550; Retrieved from Luminosity.com.

Y. Chen et al., Hollow Core DNANF Optical Fiber with <0.11 dB/km Loss, 2024 Optical Fiber Communications Conference and Exhibition (OFC), Mar. 24-28, 2024, 3 pages. Publisher: IEEE; ISBN:979-8-3503-7758-3.

Lumenci Team, Optical Transceivers:Technical and IPPerspectives, Jun. 1, 2021, 10 Pages, https://www.lumenci.com/post/optical-transceivers.

X. Jiang, Optical performance monitoring in optical long-haul transmission systems, Chapter 15 of Optical Performance Monitoring, Elsevier, 2010, 24 pages.

Y. Hong et al., Low-Latency WDM Intensity-Modulation and Direct-Detection Transmission Over> 100 km Distances in a Hollow Core Fiber, Laser Photonics Rev. 2021, 9 pages.

S. Hampton et al., Raman shifting in gas filled hollow core fiber amplifiers, Proc. of SPIE vol. 12865, Mar. 2024, 7 pages.

R. Chi, Experimental optimization of the scheme of second-order Raman amplifiers based on ultra-long span systems, Results in Physics, 18 (2020), Elsevier, 2020, 4 pages.

Non-Final Office Action of U.S. Appl. No. 18/764,093, mailed Oct. 25, 2024, 13 pages.

Notice of allowance and Notice of Allowability of U.S. Appl. No. 18/764,093, mailed Nov. 18, 2024, 5 pages.

Non-Final Office Action of U.S. Appl. No. 18/764,093, filed Jul. 3, 2024, the Non-Final Office Action mailed Oct. 25, 2024, 13 pages.

Notice of allowance and Notice of Allowability of U.S. Appl. No. 18/764,093, filed Jul. 3, 2024, the notices mailed Nov. 18, 2024, 3 pages.

International Search Report (ISR) of PCT/US25/24452 filed Apr. 13, 2025, the ISR mailed Jun. 26, 2025, 8 pages.

P. J. Russell, Photonic Crystal Fibers, Journal of Lightwave Technology, vol. 24, No. 12, pp. 4729-4749, Dec. 2006, 21 pages.

P. Kowalczyk et al., Analysis of microstructured optical fibers using compact macromodels, Optics Express, vol. 19, No. 20, pp. 19354-19364, Sep. 2011, 11 pages.

C. V. Raman et al., A New Type of Secondary Radiation, Nature, vol. 121, No. 3048, p. 501, Mar. 1928, 2 pages.

L. J. Duarte, A protocol for the investigation of the intramolecular vibrational energy redistribution problem: the isomerization of nitrous acid as a case of study, Phys. Chem. Chem. Phys., vol. 27, pp. 3685-3700, Royal Society of Chemistry Publishing, Jan. 2025, 16 pages.

D. Sadot et al., Physical Layer Security in High-Speed Optical Communications, IEEE J. of Lightwave Tech., vol. 1 , No. 1, Aug. 2024, 7 pages.

R. Piccoli, Extreme Raman Red-Shift in Nitrogen-Filled Capillary Fibers, Conference on Lasers and Electro-Optics, J. Kang et al., eds., OSA Technical Digest, CLEO 2021, San Jose, California United States, May 9-14, 2021, ISBN: 978-1-943580-91-0, 2 pages.

K. J. Vahala, Optical microcavities, Nature, vol. 424, No. 6950, pp. 839-846, Aug. 2003, 8 pages.

A. M. Vengsarkar, et al., Long-period fiber gratings as band-rejection filters, Journal of Lightwave Technology, vol. 14, No. 1, pp. 58-65, Jan. 1996, 8 pages.

* cited by examiner

Providing a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for transmission of a (e.g., communication) signal therethrough from the first end to the second end, the signal comprising electromagnetic radiation.
301

Transmitting a first laser beam having into (e.g., and through) the hollow fiber and exciting at least one member of the media members such that the at least one member excited by the first laser beam emits Raman radiation upon relaxation, the Raman radiation having a second wavelength.
302

Modulating a second laser beam to carry a signal utilized for communication and transmitting the second laser beam through the hollow fiber, the second laser beam carrying the signal being enhanced by the Raman radiation having the second wavelength, the second laser beam being enhanced during its propagation through the hollow fiber.
303

Figure 3

Using a first energy beam to excite a medium member (e.g., gas member such as a gas molecule) of a hollow fiber, the medium member consequently emitting Raman radiation at a wavelength; and transmitting through the optical fiber a second energy beam having the wavelength, the second energy beam carrying a signal to be communicated, the second energy beam being amplified by the Raman radiation in the hollow fiber.
401

Optionally (a) detecting the first energy beam exiting the fiber and/or (b) detecting the second energy beam exiting the fiber.
402

Optionally filtering out the beam having the wavelength after it exits from the fiber, the beam comprising the second laser bean and the Raman radiation
403

Detecting the signal carried by the beam having the wavelength, after the beam exits the hollow fiber, the beam comprising the second laser bean and the Raman radiation
404

Figure 4

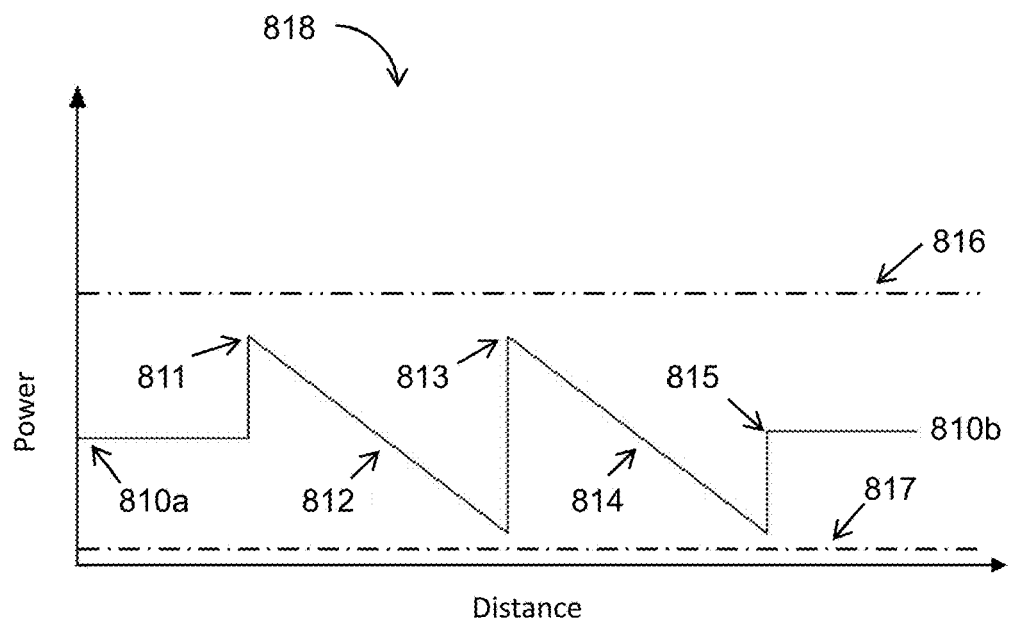
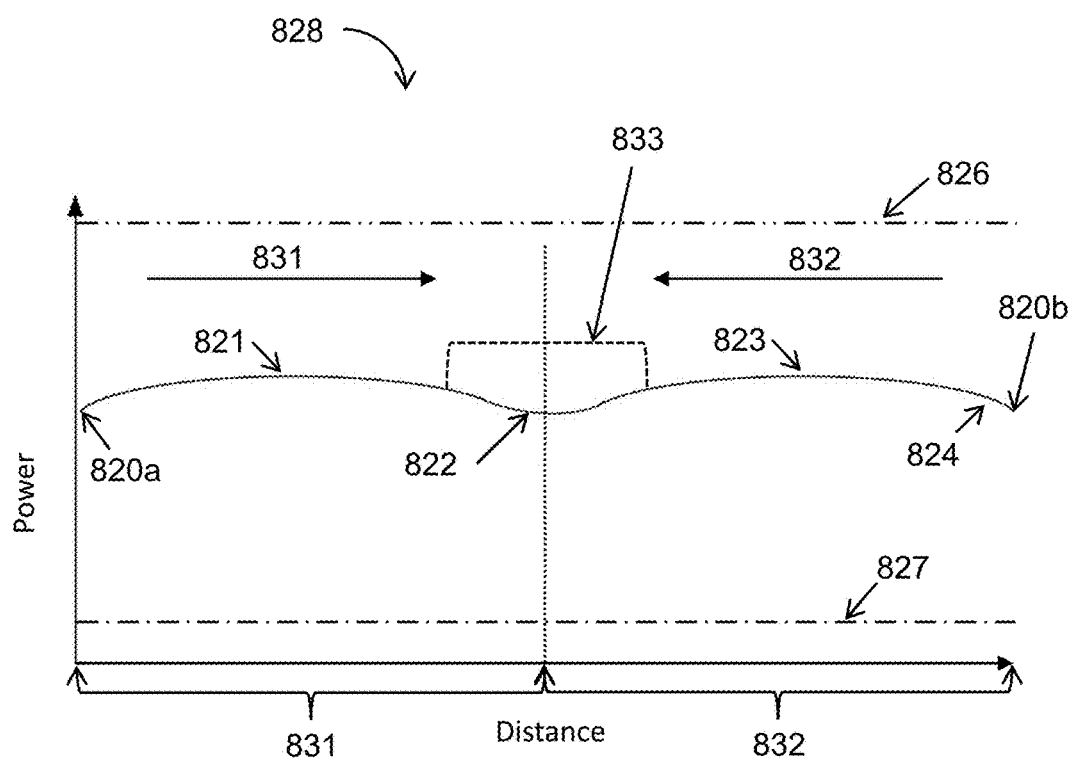
Figure 8 ized. In some instances, Raman amplification is utilized via
ENHANCED OPTICAL SIGNAL COMMUNICATION VIA HOLLOW CORE FIBERS

PRIORITY APPLICATIONS

This patent application is a continuation of U.S. non-provisional patent application Ser. No. 18/764,093 filed Jul. 3, 2024, which claims priority from U.S. provisional patent application Ser. No. 63/644,600 filed May 9, 2024, each of which is incorporated herein by reference in its entirety.

BACKGROUND

In optical communication transmission system design (e.g., for modern data centers), system, reliability, minimization of power loss and temporal latency are some key concerns. During their transmission through optical fiber, an optical signal may experience (a) latency and/or (b) signal loss. The signal loss may include (i) losses due to propagation in the optical fiber, (ii) losses associated with protection element(s) coupled with the optical fiber, or both losses (i) and (ii).

One option to enhance temporal latency may be the use of hollow core fibers that have recently been employed to improve (e.g., reduce) latency, such as by about 47%, as compared to solid core fibers.

A signal transmitted through optical fibers experiences signal loss. Such loss may include (a) intrinsic loss, (b) extrinsic loss, (c) other losses, or (d) any combination of (a), (b), and (c). For example, in (e.g., conventional) terminal transmission equipment (TTE) designs, redundant components may be used, which contribute to an extrinsic signal loss. As an example, redundant transmitters and post-amplifiers are employed on the transmitting end of the system, while redundant pre-amplifiers and receivers are employed on the receiving end. Selection of a particular transmitter and post amplifier pair may be made via a protection element, such as an optical switch, while an optical coupler may be employed to distribute the optical signal to each pre-amplifier and receiver pair. Such protection elements may contribute to extrinsic signal loss. As an example, intrinsic loss may contribute to signal loss during preparation, also referred to as "propagation loss." In addition to propagation loss such as between the transmitter and the receiver, there may be an extrinsic loss attributed to an insertion signal power loss associated with the protection elements, such as the optical coupler(s) and the switch(es). For example, an (e.g., typical) optical switch might produce a 2.5 decibel (dB) power loss, while a (e.g., typical) optical coupler might produce a loss of 4.5 dB. In a (e.g., conventional) redundant TTE optical system employing such components, there may be an approximate 7 dB tax on the system power budget attributable to the protection elements. In addition, there may be an approximate 0.15 dB/km propagation loss in solid core optical fiber.

The propagation losses of hollow-core fibers were initially far higher than for solid-core fibers. Recently, quite effective methods have been developed to mitigate that problem. Examples of loss mitigation, hollow fibers, and signal transmission, can be found in E. N. Fokoua et al., *Loss in hollow-core optical fibers: mechanisms, scaling rules, and limits*, Adv. Opt. Photon. 15 (1), 1 (2023), which is incorporated herein by reference in its entirety. Recently, some hollow-core fibers with reduced losses have been achieved, e.g., roughly comparable to those of state-of-the-art silica fibers with a solid core in the optimum wavelength region around 1.5 micrometers (μm).

In some instances, Raman amplification is utilized via Stimulated Raman Scattering (SRS) to amplify optical signals propagating through solid core optical fibers such as those comprising silica, e.g., by photons of a pump laser interacting with silica in the optical fiber (e.g., core), which silica is thus excited and emit Raman radiation upon relaxation. A wavelength of the emitted Raman radiation is shifted to longer wavelengths as compared to the wavelength of the pump laser by a Stokes shift, which wavelength of the Stokes shift is (e.g., substantially) equal to the wavelength of the signal propagating through the solid core optical fiber, thus amplifying the propagating signal.

SUMMARY

In some aspects, the present disclosure resolves one or more of the aforementioned hardships. For example, the SRS principle may be employed in hollow fibers comprising selected molecule type(s), which SRS principle is also referred to herein as "hollow core fibers," or "HC-SRS."

In another aspect, disclosed herein utilizes an interior space of the hollow optical fiber as a signal amplifier. In some embodiments, the HC-SRS signal amplification takes place in the optical fiber used for communication, e.g., in the interconnected media. In some embodiments, the HC-SRS is a distributed amplification, e.g., as the SRS occurs in the hollow core (HC) optical fiber utilized for communication. In some embodiments, the distributed amplification occurs in the media utilized for signal communication, e.g., along the communication line. In some embodiments, the SRS principle is carried in the interior space on a select molecule type. In some embodiments, such utilization comprises exciting gaseous members in the hollow interior by a first laser referred to herein as a "pump laser," which gaseous members subsequently emit radiation at a frequency of a second laser carrying a signal and referred to herein as a "Stokes laser," thus causing amplification of the signal. The gaseous members may comprise dispersed molecules or dispersed atoms. Such signal amplification facilitates (A) reduced signal loss during transmission through the optical fiber, (B) reduced latency time as compared to optical signal propagating through a solid core optical fiber, (C) increase a distance between repeaters operatively coupled with the optical fiber to facilitate (e.g., enable) the signal communication, or (D) any combination of (A) (B) and (C); with any of (A) and (C) being compared to any of the currently used signal transmission methodologies as disclosed herein. The currently used signal transmission methodologies comprise using (i) hollow optical fiber without hollow core fiber SRS, (ii) solid core optical fiber without solid core SRS (referred to herein as "SC-SRS"), (iii) solid core optical fiber with SC-SRS, or (iv) any combination of (i) (ii) and (iii). In some embodiments, such amplification of the signal may reduce (e.g., eliminate) use of one or more external components (e.g., protection elements) associated with optical fiber signal transmission. The repeaters may be regenerative or non-regenerative repeaters. The repeaters may be amplifiers.

In another aspect, the present inventions relate to method (s) (e.g., technique(s), device(s), apparatus(es), system(s), controller(s), software(s), and TTE design(s), providing (e.g., 47%) (a) reduction in latency, (b) reduction in loss, (c) increase a distance between repeaters disposed along the communication route thus reducing a number of repeaters required for signal transmission, (d) or any combination of (a) (b) and (c), in optical transmission through an optical fiber. In some embodiments, such a reduction may reduce the need for one or more external (e.g., and redundant) components such as amplifiers, as compared to any of the currently used signal transmission methodologies disclosed herein.

In another aspect, a method for optical signal communication, the method comprises: (a) providing a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for the optical signal communication comprising transmission of a signal through the hollow fiber from the first end to the second end, the signal comprising electromagnetic radiation; (b) transmitting a first laser beam into the hollow fiber to excite at least one member of the media members such that the at least one member excited by the first laser beam emits Raman radiation upon relaxation, the Raman radiation having a second wavelength; and (c) modulating a second laser beam to carry the signal utilized for the optical signal communication and transmitting the second laser beam carrying the signal through the hollow fiber, the second laser beam carrying the signal being enhanced by the Raman radiation having the second wavelength, the second laser beam being enhanced during its propagation through the hollow fiber. In some embodiments, as compared to transmission of the signal through a solid core fiber, the method comprises communicating the signal through the hollow fiber at reduced latency. In some embodiments, the second laser beam devoid of the enhancement of the Raman radiation experiences a first degree of loss as it propagates in the hollow fiber; wherein the Raman radiation is a first Raman radiation, and wherein the method comprises using the first Raman radiation to enhance the signal at least in part by generating a second degree of loss of the signal that is lower than the first degree of loss, the lower degree of loss being at least in part by (a) generating a maximum increase in a power of the signal higher than the first loss, the maximum increase being at a signal propagation distance in the hollow fiber from the first end, (b) reducing an extent of the loss of the signal over a distance of the propagation, (c) using a second Raman radiation propagating in a direction opposite to the direction of propagation of the first Raman radiation, or (d) any combination of (a) (b) and (c). In some embodiments, the extent of the second loss over a distance is a linear loss. In some embodiments, the extent of the second loss over a distance comprises a non-linear loss. In some embodiments, the non-linear loss comprises a logarithm, an exponential, or a polynomial. In some embodiments, as compared to transmission of the signal through a solid core fiber, the method comprises communicating the signal through the hollow fiber at reduced latency of at least about 40%. In some embodiments, the media is a gaseous media. In some embodiments, the gaseous media comprises molecular gas. In some embodiments, the gaseous media comprises at least one type of molecules present in an ambient atmosphere external to the hollow fiber. In some embodiments, the molecular gas comprises dry air (e.g., clean dry air), nitrogen, oxygen, or carbon dioxide. In some embodiments, the gaseous media comprises a Noble gas. In some embodiments, the gaseous media is devoid of a Noble gas. In some embodiments, the hollow fiber is configured to transmit the signal at ambient conditions of an ambient environment external to the hollow fiber. In some embodiments, the first laser beam is generated by a first laser; where the second laser beam is generated by a second laser; and where the first laser and/or the second laser, has a power of at least about 100 milli-Watts. In some embodiments, the first laser beam is generated by a first laser; where the second laser beam is generated by a second laser; and where the first laser and/or the second laser, has a power of at most about 20 Watts. In some embodiments, the hollow fiber is configured to have a spectral range of at least about 700 nanometers. In some embodiments, the hollow fiber is configured to have an attenuation of at most about 0.5 decibels (dB) per kilometer. In some embodiments, a media is disposed in at least a portion the hollow space of the hollow fiber, the hollow fiber configured such that electromagnetic radiation propagates in the media that comprises the media members, the media causing the electromagnetic radiation to attenuate by of at most about 0.5 decibels (dB) per kilometer, the electromagnetic radiation comprising (a) the first laser beam, (b) the second laser beam, or (c) the Raman radiation. In some embodiments, the hollow fiber is configured to transmit a power cross section of at least about 6 Giga Watts per square centimeter, the power cross section being (a) of the first laser beam, (b) of the second laser beam, (c) of the second laser beam and the Raman radiation, or (d) any combination of (a) (b) (c) and (d). In some embodiments, the media has a refractive index of at most about 1.2. In some embodiments, at least during use by the method, the hollow fiber is uncoiled. In some embodiments, the method further comprises using the hollow fiber for long haul transmission of the signal. In some embodiments, the method further comprises using the hollow fiber for short haul transmission of the signal. In some embodiments, the method further comprises increasing durability of the hollow fiber in an ambient environment external to the hollow fiber at least in part by encasing the hollow fiber by a casing. In some embodiments, the method further comprises coupling the hollow fiber (a) with a first wavelength division multiplexing device (WDM) at the first end and/or (b) with a second WDM at the second end. In some embodiments, during communication of the signal, the hollow fiber is not coupled (a) with a wavelength division multiplexing device (WDM) at the first end and/or (b) with a WDM at the second end. In some embodiments, during operation, the hollow fiber is utilized as an amplifier configured to amplify the signal. In some embodiments, amplifying the power of the second laser beam by the Raman radiation is by at least about 5%. In some embodiments, amplifying a power of the second laser beam by the Raman radiation allows increasing a propagation distance of the signal in at least a portion of the hollow fiber by at least about 500 Kilometers, the at least the portion of the hollow fiber being devoid of repeater, the signal at an end of the propagation distance being demodulated. In some embodiments, the hollow fiber is part of, or is configured to operatively couple with, terminal transmission equipment (TTE). In some embodiments, the first laser beam is generated by a first laser; where the second laser beam is generated by a second laser; where the TTE comprises the first laser, the second laser, a detector of the signal transmitted through the hollow fiber, and a demodulator of the signal transmitted through the hollow fiber; the method comprises using the detector to detect the signal transmitted through the hollow fiber; and demodulating the signal transmitted through the hollow fiber. In some embodiments, the TTE comprises a modulator configured to modulate the second laser beam before its transmission through the hollow fiber. In some embodiments, the detector of the signal is a second detector, and where the TTE comprises a first detector; and where the method comprises detecting the first laser beam transmitted through the hollow fiber. In some embodiments, the the TTE is devoid of a protection element. In some embodiments, the TTE is devoid of an optical switch, the protection element comprising an optical switch. In some embodiments, the TTE is devoid of an optical coupler, the protection element comprising an optical coupler. In some embodiments, the TTE is devoid of a laser beam amplifier external to the hollow fiber. In some embodiments, the laser beam amplifier comprises a pre-amplifier or a post-amplifier. In some embodiments, the method further comprises reducing a level of an external loss as compared to (a) propagating the signal through the hollow fiber without use of the first laser beam inducing the Raman radiation, (b) propagating the signal through a solid core fiber, or (c) a combination of (a) and (b). In some embodiments, the method further comprises using the Raman radiation is configured to reduce an extent of a loss experienced by the signal during its propagation through the hollow fiber, a full extent of the loss being experienced by the signal during its propagation through the hollow fiber without inducing the Raman radiation (e.g., by the first laser beam). In some embodiments, the reducing the loss facilitates enhancement of the signal through the hollow fiber, compared to (a) propagation of the signal through the hollow fiber without use of the first laser beam inducing the Raman radiation, (b) propagation of the signal through a solid core fiber, or (c) a combination of (a) and (b). In some embodiments, enhancing the signal is such that the signal at its receipt will experience a loss of at most 10% or 0.9 decibel (dB). In some embodiments, enhancing the signal at its maxima is by at least about 10% or 0.9 decibel (dB). In some embodiments, enhancing the signal comprises increasing a propagation distance of the signal that is discernible and/or otherwise usable for its intended purpose. In some embodiments, increasing the propagation distance is by at least about 10%. In some embodiments, the intended purpose of the method comprises telecommunication. In some embodiments, the telecommunication comprises image communication, voice communication, video communication, or data communication. In some embodiments, a wavelength of the second laser beam is (e.g., measurably) equal to a wavelength of a communication band, the communication band utilized for public communication, or for restricted communication in at least one jurisdiction. In some embodiments, the communication band restricted by the at least one jurisdiction is for a purpose comprising aviation communication, marine communication, or army communication. In some embodiments, a wavelength of the second laser beam is (e.g., measurably) equal to, or substantially equal to, a wavelength of a communication band utilized in at least one jurisdiction, the communication band utilized for public communication, for aviation communication, for marine communication, or for army communication. In some embodiments, a wavelength of the second laser beam is substantially equal, or (e.g., measurably) equal, to a wavelength of a communication band, the communication band comprising E band, O band, S band, L band, C, band, or U-band. In some embodiments, the communication band comprising the L band, or the C band. In some embodiments, a wavelength of the second laser beam is larger than those of U-band. In some embodiments, the first laser beam is generated by a first laser; where the second laser beam is generated by a second laser; and where the first laser and/or the second laser is a single mode laser. In some embodiments, the second laser beam is generated by a second laser being a pulsed laser. In some embodiments, the Raman radiation is a first Raman radiation co-propagating with the second laser beam carrying the signal, and where the method comprises transmitting a third laser beam into the hollow fiber to excite one or more members of the media members such that the one or more members excited by the third laser beam emit a second Raman radiation upon relaxation, the second Raman radiation having the second wavelength, the second Raman radiation counter propagating with respect to the second laser beam carrying the signal. In some embodiments, the third laser beam has (e.g., substantially) the first wavelength. In some embodiments, the third laser beam has a third wavelength different from the first wavelength. In some embodiments, the third laser beam excites the same type of the media members as the first laser beam. In some embodiments, the third laser beam excites a different type of the media members as the first laser beam. In some embodiments, the method further comprises using at least one third laser to respectively generate at least one third laser beam to each respectively carry at least one third signal, each of the at least one third laser beam deviating slightly from the second laser to form a frequency comb. In some embodiments, the method further comprises modulating each of the at least one third laser beam to respectively generate the at least one third signal. In some embodiments, one or more of the at least one third laser comprises a laser beam modulator. In some embodiments, the hollow fiber is part of, or is configured to operatively couple with, terminal transmission equipment (TTE); and where the TTE comprises, or is configured to operatively coupled with, at least one third laser; and where the method comprises respectively generating at least one third laser beam and respectively modulating the at least one third laser beam to carry at least one third signal. In some embodiments, the TTE comprises at least one third detector configured to respectively detect at least one third wavelength of the at least one third laser beam; and where the method comprises respectively detecting the at least one third wavelength using the at least one third detector. In some embodiments, the TTE comprises at least one third modulator configured to modulate the at least one third laser beam respectively; and where the method comprises respectively using the at least one modulator to modulate the at least one third laser beam to carry the at least one signal. In some embodiments, the TTE comprises at least one third detector is respectively configured to detect the signal transmitted; and where the method comprises using the at least one third detector to respectively detect the at least one signal transmitted through the hollow fiber. In some embodiments, the TTE comprises at least one third demodulator configured to respectively demodulate the at least one signal; and where the method comprises using the at least one demodulator to demodulate the at least one signal transmitted through the hollow fiber. In some embodiments, the method further comprises using one or more of the at least one third laser as a single mode laser. In some embodiments, the method further comprises using one or more of the at least one third laser as a multi-mode laser. In some embodiments, the first laser beam is generated by a first laser; and where the method further comprises using the first laser as a continuous mode laser or as a quasi-continuous mode laser. claim where the first laser beam is generated by a first laser; and where the first laser is a multi-mode laser. claim where the first laser beam is generated by a first laser; and where the first laser is a Fabry Perot laser. In some embodiments, the first laser beam is generated by a first laser; and where the method further comprises using the first laser as a pulsed laser. In some embodiments, the first laser beam is generated by a first laser being an adjustable laser; and where the method further comprises adjusting between continuous wave and (a) quasi continuous wave and/or (b) pulsed laser mode. In some embodiments, the method further comprises using at least one fourth laser to excite the media having the media member type to generate additional Raman radiation to enhance at least one additional signal wavelength, each of the at least one fourth laser generating at least one fourth laser radiation deviating slightly from the first laser to form a frequency comb. In some embodiments, the hollow fiber is part of, or is configured to operatively couple with, terminal transmission equipment (TTE); where the TTE comprises, or is configured to operatively couple with, the at least one fourth laser. In some embodiments, the TTE comprises at least one fourth detector configured to respectively detect the at least one fourth laser; and where the method comprises using the at least one fourth detector to respectively detect at least one fourth laser beam respectively generated by the at least one fourth laser, the detection being after propagation of the at least one fourth laser beam through the hollow fiber respectively. In some embodiments, the method further comprises using one or more of the at least one fourth laser as a single mode laser. In some embodiments, the method further comprises using one or more of the at least one fourth laser as a multi-mode laser. In some embodiments, the method further comprises using one or more of the at least one fourth laser as a continuous mode laser or as a quasi-continuous mode laser. In some embodiments, the method further comprises using one or more of the at least one fourth laser as a pulsed mode laser. In some embodiments, the media members comprise different chemical types of media members. In some embodiments, the media members comprise a first member type and a second member type; the method further comprises using the first laser beam to excite the first member type to emit the Raman radiation being a first Raman radiation; the method further comprises emitting a third laser beam to excite the second member type to emit a second Raman radiation having the second wavelength during the communication. In some embodiments, a first maximum intensity of the signal enhanced by the first Raman radiation peaks at a different distance from the first end of the hollow fiber as compared with a second maximum intensity of the signal enhanced by the second Raman radiation. In some embodiments, during the communication, the first laser beam experiences a different loss than the third laser beam. In some embodiments, the loss comprises an internal loss. In some embodiments, the loss comprises a propagation loss. In some embodiments, each of a plurality of pump laser beams experiences a different degree of loss during propagation through the hollow fiber, the plurality of pump laser beams comprising the first laser beam and the third laser beam. In some embodiments, the method further comprises using each of the plurality of pump laser beams to induce emission of Raman radiation to enhance the signal at different distances in the hollow fiber relative to the first end of the hollow fiber. In some embodiments, the hollow fiber has a long axis disposed from the first end to the second end, the hollow fiber comprises tubular structures disposed in the hollow space of the hollow fiber, the tubular structures are elongated and disposed along the long axis such that they surround the long axis. In some embodiments, at least one of the tubular structures is nested within a second tubular structure. In some embodiments, the second tubular structure is nested within a third tubular structure. In some embodiments, the tubular structures are symmetrically arranged about the long axis. In some embodiments, the hollow fiber comprises optical crystals. In some embodiments, modulating the signal is by a modulation comprises amplitude modulation (AM), frequency modulation (FM), polarization modulation, or phase modulation, or any combination thereof.

In another aspect, a device for optical signal communication, the device comprises: one or more components configured to execute any of methods above.

In another aspect, an apparatus for optical signal communication, the apparatus comprises: at least one controller configured to direct execution of one or more operations of any of methods above; optionally where the at least one controller is configured to connect with a power source and/or with another communication platform. In some embodiments, the other communication platform comprises cloud communication.

In another aspect, non-transitory computer readable program instructions, the program instructions, when read by one or more processors coupled with one or more components configured to execute any of methods above to the one or more processors being configured to direct execution of one or more operations of the method. In some embodiments, the program instructions are inscribed on one or more media.

In another aspect, a device for optical signal communication, the device comprises: a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for the optical signal communication comprising transmission of a signal therethrough from the first end to the second end, the signal comprising electromagnetic radiation; a first laser configured for generating a first laser beam having a first wavelength, the first laser beam being configured to excite at least one member of the media members such that the at least one member excited by the first laser beam emits Raman radiation upon relaxation, the Raman radiation having a second wavelength, the first laser operatively coupled with the hollow fiber; and a second laser configured for generating a second laser beam having the second wavelength, the second laser beam being modulated to carry the signal utilized for the optical signal communication, the second laser beam being enhanced by the Raman radiation having the second wavelength, the second laser beam being enhanced by the Raman radiation during its propagation through the hollow fiber, the second laser operatively coupled with the hollow fiber at the first end. In some embodiments, the device is configured such that the second laser beam devoid of the enhancement of the Raman radiation experiences a first degree of loss as it propagates in the hollow fiber; wherein the Raman radiation is a first Raman radiation, and where the device is configured to utilize the first Raman radiation to enhance the signal at least in part by the device being configured to generate a second degree of loss of the signal lower than the first degree of loss, the second degree of loss being lower at least in part by the device being configured to (a) generate a maximum increase in a power of the signal higher than the first loss, the maximum increase being at a signal propagation distance in the hollow fiber from the first end, (b) reduce an extent of the loss of the signal over a distance of the propagation, (c) use a second Raman radiation propagating in a direction opposite to the direction of propagation of the first Raman radiation, or (d) any combination of (a) (b) and (c). In some embodiments, the device is configured such that the extent of the second loss over a distance is a linear loss. In some embodiments, the device is configured such that the extent of the second loss over a distance comprises a non-linear loss. In some embodiments, the device is configured such that the non-linear loss comprises a logarithm, an exponential, or a polynomial. In some embodiments, the hollow fiber is configured to reduce latency of the signal as compared to transmission of the signal through a solid core fiber. In some embodiments, the hollow fiber is configured to reduce latency of the signal by at least about 40% as compared to transmission of the signal through solid core fiber. In some embodiments, the media members are of the same chemical type. In some embodiments, the media is a gaseous media. In some embodiments, the gaseous media comprises molecular gas. In some embodiments, the gaseous media comprises at least one type of molecules present in an ambient atmosphere external to the hollow fiber. In some embodiments, the molecular gas comprises dry air, nitrogen, oxygen, or carbon dioxide. In some embodiments, the gaseous media comprises a Noble gas. In some embodiments, the gaseous media is devoid of a Noble gas. In some embodiments, the hollow fiber is configured to transmit the signal at ambient conditions of an ambient environment external to the hollow fiber. In some embodiments, the media has a refractive index of at most about 1.2. In some embodiments, the first laser and/or the second laser, have a power of at least about 100 milli-Watts. In some embodiments, the first laser and/or the second laser, has a power of at most about 20 Watts. In some embodiments, the hollow fiber is configured to have a spectral range of at least about 700 nanometers. In some embodiments, the hollow fiber is configured to have an attenuation of at most about 0.5 decibels (dB) per kilometer. In some embodiments, a media is disposed in at least a portion the hollow space of the hollow fiber, the hollow fiber configured such that electromagnetic radiation propagates in the media that comprises the media members, the media causing the electromagnetic radiation to attenuate by of at most about 0.5 decibels (dB) per kilometer, the electromagnetic radiation comprising (a) the first laser beam, (b) the second laser beam, or (c) the Raman radiation. In some embodiments, the device is configured to transmit a power cross section of at least about 6 Giga Watts per square centimeter, the power cross section being (a) of the first laser beam, (b) of the second laser beam, (c) of the second laser beam and the Raman radiation, or (d) any combination of (a) (b) (c) and (d). In some embodiments, at least during operation, the hollow fiber is uncoiled. In some embodiments, the hollow fiber is configured for long haul transmission of the signal. In some embodiments, the hollow fiber is configured for short haul transmission of the signal. In some embodiments, the hollow fiber is encased by a casing that increases durability of the hollow fiber in an ambient environment external to the hollow fiber. In some embodiments, the device further comprises coupling the hollow fiber (a) with a first wavelength division multiplexing device (WDM) at the first end and/or (b) with a second WDM at the second end. In some embodiments, during communication of the signal, the hollow fiber is not coupled (a) with a wavelength division multiplexing device (WDM) at the first end and/or (b) with a WDM at the second end. In some embodiments, during operation, the hollow fiber is configured to act as an amplifier configured to amplify the signal. In some embodiments, amplifying the power of the second laser beam by the Raman radiation is by at least about 5%. In some embodiments, amplifying a power of the second laser beam by the Raman radiation allows increasing a propagation distance of the signal in at least a portion of the hollow fiber by at least about 500 Kilometers, the at least the portion of the hollow fiber being devoid of repeater, the signal at an end of the propagation distance being demodu-lated. In some embodiments, the hollow fiber is part of, or is configured to operatively couple with, terminal transmission equipment (TTE). In some embodiments, the TTE comprises the first laser, the second laser, a detector of the signal transmitted through the hollow fiber, and a demodulator of the signal transmitted through the hollow fiber. In some embodiments, the TTE comprises a modulator configured to modulate the second laser beam before its transmission through the hollow fiber. In some embodiments, the detector of the signal is a second detector, and where the TTE comprises a first detector configured to detect the first laser beam transmitted through the hollow fiber. In some embodiments, the TTE is devoid of a protection element. In some embodiments, the TTE is devoid of an optical switch, the protection element comprising an optical switch. In some embodiments, the TTE is devoid of an optical coupler, the protection element comprising an optical coupler. In some embodiments, the TTE is devoid of a laser beam amplifier external to the hollow fiber. In some embodiments, the laser beam amplifier comprises a pre-amplifier or a post-amplifier. In some embodiments, the device is configured to incur reduced level of an external loss as compared to (a) propagation of the signal through the hollow fiber without use of the first laser beam inducing the Raman radiation, (b) propagation of the signal through a solid core fiber, or (c) a combination of (a) and (b). In some embodiments, during use, the Raman radiation is configured to reduce an extent of a loss experienced by the signal during its propagation through the hollow fiber, a full extent of the loss being experienced by the signal during its propagation through the hollow fiber without inducing the Raman radiation (e.g., by the first laser beam). In some embodiments, reduction of the loss facilitates enhancement of the signal through the hollow fiber, compared to (a) propagation of the signal through the hollow fiber without use of the first laser beam inducing the Raman radiation, (b) propagation of the signal through a solid core fiber, or (c) a combination of (a) and (b). In some embodiments, the enhancement of the signal is such that the signal at its receipt will experience a loss of at most 10% or 0.9 decibel (dB). In some embodiments, the enhancement of the signal at its maxima is by at least about 10% or 0.9 decibel (dB). In some embodiments, the enhancement of the signal comprises increasing a propagation distance of the signal that is discernible and/or otherwise usable for its intended purpose. In some embodiments, the increased propagation distance is by at least about 10%. In some embodiments, the intended purpose comprises telecommunication. In some embodiments, the telecommunication comprises image communication, voice communication, video communication, or data communication. In some embodiments, a wavelength of the second laser beam is (e.g., measurably) equal to, or substantially equal to, a wavelength of a communication band, the communication band utilized for public communication, or for restricted communication in at least one jurisdiction. In some embodiments, the communication band restricted by the at least one jurisdiction is for a purpose comprising aviation communication, marine communication, or army communication. In some embodiments, a wavelength of the second laser beam is (e.g., measurably) equal to, or substantially equal to, a wavelength of a communication band utilized in at least one jurisdiction, the communication band utilized for public communication, for aviation communication, for marine communication, or for army communication. In some embodiments, a wavelength of the second laser beam is substantially equal, or (e.g., measurably) equal, to a wavelength of a communication band, the communication band comprising E band, O band, S band, L band, C band, or U band. In some embodiments, the communication band comprises the L band, or the C band. In some embodiments, the wavelength of the second laser beam is larger than those of U-band. In some embodiments, the first laser and/or the second laser is a single mode laser. In some embodiments, the second laser is a pulsed laser. In some embodiments, the first laser is coupled with the second end of the hollow core fiber, the device being configured such that during use the Raman radiation counter-propagates with respect to the second laser beam carrying the signal. In some embodiments, the first laser is coupled with the first end of the hollow core fiber, the device being configured such that during use the Raman radiation co-propagates with the second laser beam carrying the signal. In some embodiments, the Raman radiation is a first Raman radiation having the second wavelength, and where the device further comprises a third laser configured for generating a third laser beam configured to excite one or more members of the media members such that the one or more members excited by the third laser beam emit a second Raman radiation upon relaxation, the second Raman radiation having the second wavelength, the third laser being operatively coupled with the hollow fiber at the second end, the device being configured such that during use the second Raman radiation counter propagates relative to the second laser beam carrying the signal. In some embodiments, the third laser is configured to generate the third laser beam having (e.g., substantially) the first wavelength. In some embodiments, the third laser is configured to generate the third laser beam having a third wavelength different from the first wavelength. In some embodiments, the third laser is configured to generate the third laser beam exiting the same type of the media members as the first laser beam. In some embodiments, the third laser is configured to generate the third laser beam exiting a different type of the media members as the first laser beam. In some embodiments, the device further comprises at least one third laser, each of the at least one third laser being a single mode laser, each of the at least one third laser generating respectively at least one third laser beam subsequently configured to respectively carry at least one third signal, each of the at least one third laser beam deviating slightly from the second laser to form a frequency comb. In some embodiments, one or more of the at least one third laser comprises a laser beam modulator. In some embodiments, the hollow fiber is part of, or is configured to operatively couple with, terminal transmission equipment (TTE); and where the TTE comprises, or is configured to operatively coupled with, at least one third laser configured to respectively generate at least one third laser beam subsequently configured to respectively carry at least one third signal. In some embodiments, the TTE comprises at least one third detector configured to respectively detect at least one third wavelength of the at least one third laser beam. In some embodiments, the TTE comprises at least one third modulator configured to modulate the at least one third laser beam, respectively. In some embodiments, the TTE comprises at least one third detector is respectively configured to detect the at least one signal transmitted through the hollow fiber. In some embodiments, the TTE comprises at least one third demodulator configured to respectively demodulate the at least one signal transmitted through the hollow fiber. In some embodiments, one or more of the at least one third laser is a single mode laser. In some embodiments, one or more of the at least one third laser is a multi mode laser. In some embodiments, the first laser is a continuous mode laser or a quasi-continuous mode laser. In some embodiments, the first laser is a pulsed laser. In some embodiments, the first laser is an adjustable laser, configured to adjust between continuous wave and (a) quasi continuous wave and/or (b) pulsed laser mode. In some embodiments, the device further comprises at least one fourth laser configured to excite the media and generate additional Raman radiation to enhance at least one additional signal wavelength, each of the at least one fourth laser configured to generate at least one fourth laser beam deviating slightly from the first laser to form a frequency comb. In some embodiments, the first laser is a multi-mode laser. In some embodiments, the first laser is a Fabry Perot laser. In some embodiments, the hollow fiber is part of, or is configured to operatively couple with, terminal transmission equipment (TTE); and where the TTE comprises, or is configured to operatively couple with, the at least one fourth laser. In some embodiments, the TTE comprises at least one fourth detector configured to respectively detect the at least one fourth laser. In some embodiments, one or more of the at least one fourth laser is a single mode laser. In some embodiments, one or more of the at least one fourth laser is a multimode laser. In some embodiments, one or more of the at least one fourth laser is a continuous mode laser or a quasi-continuous mode laser. In some embodiments, one or more of the at least one fourth laser is a pulsed mode laser. In some embodiments, the media members comprise different chemical types of media members. In some embodiments, the media members comprise a first member type and a second member type, where the first laser beam excites the first member type that subsequently emits the Raman radiation being a first Raman radiation; further comprises emitting a third laser beam by a third laser, and exciting the second member type by the third laser beam to emit a second Raman radiation having the second wavelength during the communication. In some embodiments, the device is configured such that during the communication, a first maximum intensity of the signal enhanced by the first Raman radiation peaks at a different distance from the first end of the hollow fiber as compared with a second maximum intensity of the signal enhanced by the second Raman radiation. In some embodiments, the device is configured such that during the communication, the first laser beam experiences a different loss than the third laser beam. In some embodiments, the loss comprises an internal loss. In some embodiments, the loss comprises a propagation loss. In some embodiments, the first laser is a pump laser; where the device comprises laser pumps comprising the pump laser, each of the pump lasers being configured to excite a different media member type of the media members to emit the Raman radiation to amplify the signal. In some embodiments, each of the pump lasers experiencing different loss during the communication. In some embodiments, each of the pump lasers induces emission of the Raman radiation to enhance the signal at different distances in the hollow fiber relative to the first end of the hollow fiber. In some embodiments, the hollow fiber has a long axis disposed from the first end to the second end, the hollow fiber comprises tubular structures disposed in the hollow space of the hollow fiber, the tubular structures are elongated and disposed along the long axis such that they surround the long axis. In some embodiments, at least one of the tubular structures is nested within a second tubular structure. In some embodiments, the second tubular structure is nested within a third tubular structure. In some embodiments, the tubular structures are symmetrically arranged about the long axis. In some embodiments, the hollow fiber comprises optical crystals. In some embodiments, the modulation of the signal comprises amplitude modulation (AM), frequency modulation (FM), polarization modulation, or phase modulation, or any combination thereof.

In another aspect, a method for optical signal communication, the method comprises: providing any of the above devices; and using the device for the optical signal communication.

In another aspect, an apparatus for optical signal communication, the apparatus comprises: at least one controller configured to operatively couple with any of the above devices; and configured to direct use of one or more components of the device for the optical signal communication. In some embodiments, the at least one controller is configured to connect with a power source and/or with another communication platform. In some embodiments, the other communication platform comprises cloud communication.

In another aspect, non-transitory computer readable program instructions, the program instructions, when coupled with any of the above devices, are configured to direct one or more components of the device for the communication. In some embodiments, the program instructions are inscribed on one or more media.

In another aspect, a device for optical signal communication, the device comprises: a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for the optical signal communication comprising transmission of a signal therethrough from the first end to the second end, the hollow fiber being configured for transmission (A) of a first laser beam having a first wavelength configured to excite at least one of the media members that subsequently emit radiation having a second wavelength via Raman radiation and (B) of a second laser beam carrying the signal, the second laser beam having the second wavelength, the hollow fiber being configured for amplification of the second laser beam by the Raman radiation during propagation of the second laser beam through the hollow fiber; a modulator configured to modulate the second laser beam to carry the signal before the signal enters the hollow fiber, the modulator being operatively coupled with the hollow fiber at a first end of the hollow fiber; an optical coupler (e.g., a wavelength division multiplexer (WDM)) configured to join the first laser beam with the second laser beam for propagation along (and within) the hollow fiber, the optical coupler being operatively coupled with the hollow fiber at its first end, the optical coupler being operatively coupled with the modulator, the optical coupler being configured to operatively couple (a) to a first laser configured to generate the first laser beam and (b) to a second laser configured to generate the second laser beam; and a demodulator configured to demodulate the signal to recover information embedded in the signal amplified via the Raman radiation, the demodulator being operatively coupled with the hollow fiber that is configured for the optical signal communication. In some embodiments, the device further comprises the first laser and/or the second laser. In some embodiments, the device is configured such that the second laser beam devoid of the enhancement of the Raman radiation experiences a first degree of loss as it propagates in the hollow fiber; wherein the Raman radiation is a first Raman radiation, and where the device is configured to utilize the first Raman radiation to enhance the signal at least in part by the device being configured to generate a second degree of loss of the signal lower than the first degree of loss, the second degree of loss being lower at least in part by the device being configured to (a) generate a maximum increase in a power of the signal higher than the first loss, the maximum increase being at a signal propagation distance in the hollow fiber from the first end, (b) reduce an extent of the loss of the signal over a distance of the propagation, (c) use a second Raman radiation propagating in a direction opposite to the direction of propagation of the first Raman radiation, or (d) any combination of (a) (b) and (c). In some embodiments, the device is configured such that the extent of the second loss over a distance is a linear loss. In some embodiments, the device is configured such that the extent of the second loss over a distance comprises a non-linear loss. In some embodiments, the device is configured such that the non-linear loss comprises a logarithm, an exponential, or a polynomial. In some embodiments, the optical coupler comprises a first WDM, and where the device comprises a second WDM configured to separate the first laser beam from the signal after their propagation along the hollow fiber, the second WDM being operatively coupled with the hollow fiber at its second end. In some embodiments, the first WDM is substantially of the same type as the second WDM. In some embodiments, the first WDM is different than the second WDM. In some embodiments, the modulator is separate from the second laser. In some embodiments, the modulator is embedded in the second laser. In some embodiments, the hollow fiber is configured to reduce latency of the signal as compared to transmission of the signal through a solid core fiber. In some embodiments, the hollow fiber is configured to reduce latency of the signal by at least about 40% as compared to transmission of the signal through solid core fiber. In some embodiments, the media is a gaseous media. In some embodiments, the gaseous media comprises molecular gas. In some embodiments, the gaseous media comprises at least one type of molecules present in an ambient atmosphere external to the hollow fiber. In some embodiments, the molecular gas comprises dry air, nitrogen, oxygen, or carbon dioxide. In some embodiments, the gaseous media comprises a Noble gas. In some embodiments, the gaseous media is devoid of a Noble gas. In some embodiments, the hollow fiber is configured to transmit the signal at ambient conditions of an ambient environment external to the hollow fiber. In some embodiments, the media has a refractive index of at most about 1.2. In some embodiments, the first laser and/or the second laser, have a power of at least about 100 milli-Watts. In some embodiments, the first laser and/or the second laser, have a power of at most about 20 Watts. In some embodiments, the hollow fiber is configured to have a spectral range of at least about 700 nanometers. In some embodiments, the hollow fiber is configured to have an attenuation of at most about 0.5 decibels (dB) per kilometer. In some embodiments, a media is disposed in at least a portion the hollow space of the hollow fiber, the hollow fiber configured such that electromagnetic radiation propagates in the media that comprises the media members, the media causing the electromagnetic radiation to attenuate by of at most about 0.5 decibels (dB) per kilometer, the electromagnetic radiation comprising (a) the first laser beam, (b) the second laser beam, or (c) the Raman radiation. In some embodiments, the device is configured to transmit a power cross section of at least about 6 Giga Watts per square centimeter, the power cross section being (a) of the first laser beam, (b) of the second laser beam, (c) of the second laser beam and the Raman radiation, or (d) any combination of (a) (b) and (c). In some embodiments, at least during operation, the hollow fiber is uncoiled. In some embodiments, the hollow fiber is configured for long haul transmission of the signal. In some embodiments, the hollow fiber is configured for short haul transmission of the signal. In some embodiments, the hollow fiber is encased by a casing that increases durability of the hollow fiber in an ambient environment external to the hollow fiber. In some embodiments, during operation, the hollow fiber is configured to act as an amplifier configured to amplify the signal. In some embodiments, the device is configured to amplify a power of the second laser beam by the Raman radiation is of at least about 5%. In some embodiments, the device is configured to amplify a power of the second laser beam by the Raman radiation allows increasing a propagation distance of the signal in at least a portion of the hollow fiber by at least about 500 Kilometers, the at least the portion of the hollow fiber being devoid of repeater, the signal at an end of the propagation distance being demodulated. In some embodiments, the device further comprises a first detector configured to detect the first laser beam after its transmission through the hollow fiber, the first detector being operatively coupled (i) to the second end of the hollow fiber, and (ii) to the demodulator. In some embodiments, the device further comprises a second detector configured to detect the signal after its transmission through the hollow fiber, the second detector being operatively coupled (i) to the second end of the hollow fiber, and (ii) to the demodulator. In some embodiments, the device (I) is devoid of a protection element and/or (II) is not configured to couple to a protection element comprising an optical switch. In some embodiments, the device (I) is devoid of a component and/or (II) is not configured to couple to the component comprising (i) an optical switch (ii) an optical coupler, (iii) a pre-beam multiplier, or (iv) a post beam multiplier. In some embodiments, the device (I) is devoid of a laser beam amplifier external to the hollow fiber, and/or (II) is not configured to couple to the laser beam amplifier external to the hollow fiber. In some embodiments, the laser beam amplifier comprises a pre-amplifier or a post-amplifier. In some embodiments, the device is configured to incur reduced level of an external loss as compared to (a) propagation of the signal through the hollow fiber without use of the first laser beam inducing the Raman radiation, (b) propagation of the signal through a solid core fiber, or (c) a combination of (a) and (b). In some embodiments, the device is configured such that during use, the Raman radiation is configured to reduce an extent of a loss experienced by the signal during its propagation through the hollow fiber, a full extent of the loss being experienced by the signal during its propagation through the hollow fiber without inducing the Raman radiation (e.g., by the first laser beam). In some embodiments, the device is configured such that reduction of the loss facilitates enhancement of the signal through the hollow fiber, compared to (a) propagation of the signal through the hollow fiber without use of the first laser beam inducing the Raman radiation, (b) propagation of the signal through a solid core fiber, or (c) a combination of (a) and (b). In some embodiments, the device is configured such that the enhancement of the signal is such that the signal at its receipt will experience a loss of at most 10% or 0.9 decibel (dB). In some embodiments, the device is configured such that the enhancement of the signal at its maximum is by at least about 10% or 0.9 decibel (dB). In some embodiments, the device is configured such that the enhancement of the signal comprises increasing a propagation distance of the signal that is discernible and/or otherwise usable for its intended purpose. In some embodiments, the device is configured such that the increased propagation distance is by at least about 10%. In some embodiments, the intended purpose comprises telecommunication. In some embodiments, the telecommunication comprises image communication, voice communication, video communication, or data communication. In some embodiments, a wavelength of the second laser beam is equal to, or substantially equal to, a wavelength of a communication band, the communication band utilized for public communication, or for restricted communication in at least one jurisdiction. In some embodiments, the communication band restricted by the at least one jurisdiction is for a purpose comprising aviation communication, marine communication, or army communication. In some embodiments, a wavelength of the second laser beam is (e.g., measurably) equal to, or substantially equal to, a wavelength of a communication band utilized in at least one jurisdiction, the communication band utilized for public communication, for aviation communication, for marine communication, or for army communication. In some embodiments, a wavelength of the second laser beam is substantially equal, or (e.g., measurably) equal, to a wavelength of a communication band, the communication band comprising E band, O band, S band, L band, C band, or U band. In some embodiments, the communication band comprises the L band, or the C band. In some embodiments, the wavelength of the second laser beam is larger than those of U-band. In some embodiments, the first laser and/or the second laser is a single mode laser. In some embodiments, the second laser is a pulsed laser. In some embodiments, the Raman radiation is a first Raman radiation having the second wavelength; where the optical coupler is a first optical coupler; and where the device comprises a second optical coupler coupled with the hollow fiber at its second end, the second optical coupler being configured to operatively couple with a third laser generating a third laser beam, the second optical coupler being configured to allow the third laser beam to propagate along the hollow fiber in a counter direction with respect to the second laser beam carrying the signal, the device being configured such that during use, the third laser beam excites one or more members of the media members to cause emission of a second Raman radiation upon relaxation of the one or more members, the second Raman radiation having the second wavelength. In some embodiments, the third laser is configured to generate the third laser beam having (e.g., substantially) the first wavelength. In some embodiments, the third laser is configured to generate the third laser beam having a third wavelength different from the first wavelength. In some embodiments, the third laser is configured to generate the third laser beam exiting the same type of the media members as the first laser beam. In some embodiments, the third laser is configured to generate the third laser beam exiting a different type of the media members as the first laser beam. In some embodiments, the second coupler is configured to decouple the first laser beam from the second laser beam. In some embodiments, the second coupler is configured to decouple the first laser beam from the signal. In some embodiments, the second coupler is configured to decouple the first wavelength from the second wavelength. In some embodiments, the device further comprises at least one third laser, each of the at least one third laser being a single mode laser, each of the at least one third laser generating respectively at least one third laser beam subsequently configured to respectively carry at least one third signal, each of the at least one third laser beam deviating slightly from the second laser to form a frequency comb. In some embodiments, one or more of the at least one third laser comprises a laser beam modulator. In some embodiments, the device comprises, or is configured to operatively coupled with, at least one third laser configured to respectively generate at least one third laser beam subsequently configured to respectively carry at least one third signal. In some embodiments, the device further comprises at least one third detector configured to respectively detect at least one third wavelength of the at least one third laser beam. In some embodiments, the device further comprises at least one third modulator configured to modulate the at least one third laser beam, respectively. In some embodiments, the device further comprises at least one third detector is respectively configured to detect the at least one signal transmitted through the hollow fiber. In some embodiments, the device further comprises at least one third demodulator configured to respectively demodulate the at least one signal transmitted through the hollow fiber. In some embodiments, one or more of the at least one third laser is a single mode laser. In some embodiments, one or more of the at least one third laser is a multi mode laser. In some embodiments, the first laser is a continuous mode laser or a quasi-continuous mode laser. In some embodiments, the first laser is a pulsed laser. In some embodiments, the first laser is an adjustable laser, configured to adjust between continuous wave and (a) quasi continuous wave and/or (b) pulsed laser mode. In some embodiments, the device further comprises at least one fourth laser configured to excite the media and generate additional Raman radiation to enhance at least one additional signal wavelength, each of the at least one fourth laser configured to generate at least one fourth laser radiation deviating slightly from the first laser to form a frequency comb. In some embodiments, the first laser is a multi-mode laser. In some embodiments, the first laser is a Fabry Perot laser. In some embodiments, the device comprises, or is configured to operatively couple with, the at least one fourth laser. In some embodiments, the device further comprises at least one fourth detector configured to respectively detect the at least one fourth laser. In some embodiments, one or more of the at least one fourth laser is a single mode laser. In some embodiments, one or more of the at least one fourth laser is a multimode laser. In some embodiments, one or more of the at least one fourth laser is a continuous mode laser or a quasi-continuous mode laser. In some embodiments, one or more of the at least one fourth laser is a pulsed mode laser. In some embodiments, the media members comprise different chemical types of media members. In some embodiments, the media members comprise a first member type and a second member type, where the first laser beam is configured to excite the first member type that subsequently emits the Raman radiation being a first Raman radiation; and where the optical coupler is configured to operatively couple to a third laser configured to emit a third laser beam configured to excite the second member type to emit a second Raman radiation during the communication. In some embodiments, the device is configured such that during the communication, a first maximum intensity of the signal enhanced by the first Raman radiation peaks at a different distance from the first end of the hollow fiber as compared with a second maximum intensity of the signal enhanced by the second Raman radiation. In some embodiments, the device is configured such that during the communication, the first laser beam experiences a different loss than the third laser beam. In some embodiments, the loss comprises an internal loss. In some embodiments, the loss comprises a propagation loss. In some embodiments, the first laser is a pump laser; where the device comprises the pump laser pumps comprising the pump laser, each of the pump lasers being configured to excite a different media member type of the media members to emit the Raman radiation to amplify the signal. In some embodiments, each of the pump lasers experiencing different loss during the communication. In some embodiments, each of the pump lasers induces emission of the Raman radiation to enhance the signal at different distances in the hollow fiber relative to the first end of the hollow fiber. In some embodiments, the hollow fiber has a long axis disposed from the first end to the second end, the hollow fiber comprises tubular structures disposed in the hollow space of the hollow fiber, the tubular structures are elongated and disposed along the long axis such that they surround the long axis. In some embodiments, at least one of the tubular structures is nested within a second tubular structure. In some embodiments, the second tubular structure is nested within a third tubular structure. In some embodiments, the tubular structures are symmetrically arranged about the long axis. In some embodiments, the hollow fiber comprises optical crystals. In some embodiments, the modulation of the signal comprises amplitude modulation (AM), frequency modulation (FM), polarization modulation, or phase modulation, or any combination thereof.

In another aspect, a method for optical signal communication, the method comprises: providing any of the above devices; and using the device for the optical signal communication.

In another aspect, an apparatus for optical signal communication, the apparatus comprises: at least one controller configured to operatively couple with any of the above devices; and configured to direct use of one or more components of the device for the optical signal communication. In some embodiments, the at least one controller is configured to connect with a power source and/or with another communication platform. In some embodiments, the other communication platform comprises cloud communication.

In another aspect, non-transitory computer readable program instructions, the program instructions, when coupled with any of the above devices, are configured to direct one or more components of the device for the communication. In some embodiments, the program instructions are inscribed on one or more media.

In another aspect, a system for effectuating the methods, operations of an apparatus, and/or operations inscribed by non-transitory computer readable program instructions (e.g., inscribed on a media/medium), disclosed herein.

In another aspect, a system for effectuating the methods, operations of an apparatus, operation of a device, and/or operations inscribed by non-transitory computer readable program instructions (e.g., inscribed on a media/medium), disclosed herein.

In another aspect, device(s) (e.g., apparatus) for effectuating the methods, operations of an apparatus, and/or operations inscribed by non-transitory computer readable program instructions (e.g., inscribed on a media/medium).

In other aspects, systems, apparatuses (e.g., controller(s)), and/or non-transitory computer-readable program instructions (e.g., software) that implement any of the methods disclosed herein. In some embodiments, the program instructions are inscribed on at least one computer readable medium (e.g., on a medium or on media).

In other aspects, methods, systems, apparatuses (e.g., controller(s)), and/or non-transitory computer-readable program instructions (e.g., software) that implement any of the devices disclosed herein and/or any operation of these devices. In some embodiments, the program instructions are inscribed on at least one medium (e.g., on a medium or on media).

In another aspect, an apparatus comprises at least one controller that is configured (e.g., programmed) to direct a mechanism used a methodology disclosed herein to implement (e.g., effectuate) any of the method and/or operations disclosed herein, wherein the controller(s) is operatively coupled with the mechanism. In some embodiments, the controller(s) implements any of the methods and/or operations disclosed herein. In some embodiments, the at least one controller comprises, or is operatively coupled with, a hierarchical control system. In some embodiments, the hierarchical control system comprises at least three, four, or five, control levels. In some embodiments, at least two operations are performed, or directed, by the same controller. In some embodiments, at least two operations are each performed, or directed, by a different controller.

In another aspect, an apparatus comprises at least one controller that is configured (e.g., programmed) to implement (e.g., effectuate), or direct implementation of, the method, process, and/or operation disclosed herein. In some embodiments, the at least one controller implements any of the methods, processes, and/or operations disclosed herein.

In another aspect, non-transitory computer readable program instructions, when read by one or more processors, are configured to execute, or direct execution of, the method, process, and/or operation disclosed herein. In some embodiments, the at least one controller implements any of the methods, processes, and/or operations disclosed herein. In some embodiments, at least a portion of the one or more processors is part of a mechanism, outside of the mechanism, or in a location remote from the mechanism disclosed herein (e.g., in the cloud).

In another aspect, a system comprises an apparatus and at least one controller that is configured (e.g., programmed) to direct operation of the apparatus, wherein the at least one controller is operatively coupled with the apparatus. In some embodiments, the apparatus includes any apparatus or device disclosed herein. In some embodiments, the at least one controller implements, or direct implementation of, any of the methods disclosed herein. In some embodiments, the at least one controller directs any apparatus (or component thereof) disclosed herein.

In some embodiments, at least two of operations (e.g., instructions) of the apparatus are directed by the same controller. In some embodiments, at least two of the operations (e.g., instructions) of the apparatus are directed by different controllers. In some embodiments, at least two of the operations (e.g., instructions) are conducted by the same processor and/or by the same sub-computer software product. In some embodiments, at least two of the operations (e.g., instructions) are conducted (e.g., carried out) by different processors and/or by different sub-computer software products.

In another aspect, a computer software product, comprising a (e.g., non-transitory) computer-readable medium/media in which program instructions are stored, which instructions, when read by a computer, cause the computer to direct a mechanism used to implement (e.g., effectuate) any of the method disclosed herein, wherein the non-transitory computer-readable medium is operatively coupled with the mechanism. In some embodiments, the mechanism comprises an apparatus or an apparatus component.

In another aspect, a computer system comprising one or more computer processors and non-transitory computer-readable medium/media coupled thereto. In some embodiments, the non-transitory computer-readable medium/media comprises machine-executable code that, upon execution by the one or more computer processors, implements any of the methods and/or operations (e.g., as disclosed herein), and/or effectuates directions of the controller(s) (e.g., as disclosed herein).

In another aspect, a method comprises executing one or more operations associated with at least one configuration of the mechanism(s) (e.g., device(s)) disclosed herein.

In another aspect, an apparatus comprises at least one controller is configured (i) operatively couple to the device, and (ii) direct executing one or more operations associated with at least one configuration of the device(s) disclosed herein.

In another aspect, at least one controller is associated with the methods, devices, and software disclosed herein. In some embodiments, the at least one controller comprises at least one connector configured to connect to a power source. In some embodiments, the at least one controller being configured to operatively couple to a power source at least in part by (I) having a power socket and/or (II) being configured for wireless power transfer using inductive charging. In some embodiments, the at least one controller is included in, or comprises, a hierarchical control system. In some embodiments, the hierarchical control system comprises at least three hierarchical control levels. In some embodiments, the at least one controller is included in a control system disclosed herein. In some embodiments, the at least one controller is configured to control at least one other component of a mechanism (e.g., system, device, or apparatus) disclosed herein. In some embodiments, the device disclosed herein is a component of a system, and wherein the at least one controller is configured to (i) operatively couple to another component of the system and (ii) direct operation of the other component. In some embodiments, the at least one controller is configured to direct operation of the other component at least in part for participation of the other component in a method disclosed herein.

In another aspect, non-transitory computer readable program instructions for a method disclosed herein, the non-transitory computer readable program instructions, when read by one or more processors operatively coupled with the device, cause the one or more processors to direct executing one or more operations associated with at least one configuration of the device(s) disclosed herein.

In some embodiments, the program instructions are of a computer product.

The various embodiments in any of the above aspects are combinable (e.g., within an aspect), as appropriate. Individual features (e.g., embodiments) disclosed herein are combinable in any manner desired, as applicable.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings or figures (also "Fig." and "Figs." herein), of which:

FIG. 3 is a block diagram of a communication method;

FIG. 4 is a block diagram of a communication method;

FIG. 8 schematically illustrates graphs depicting laser beam powers as a function of distance;

Figure 1:
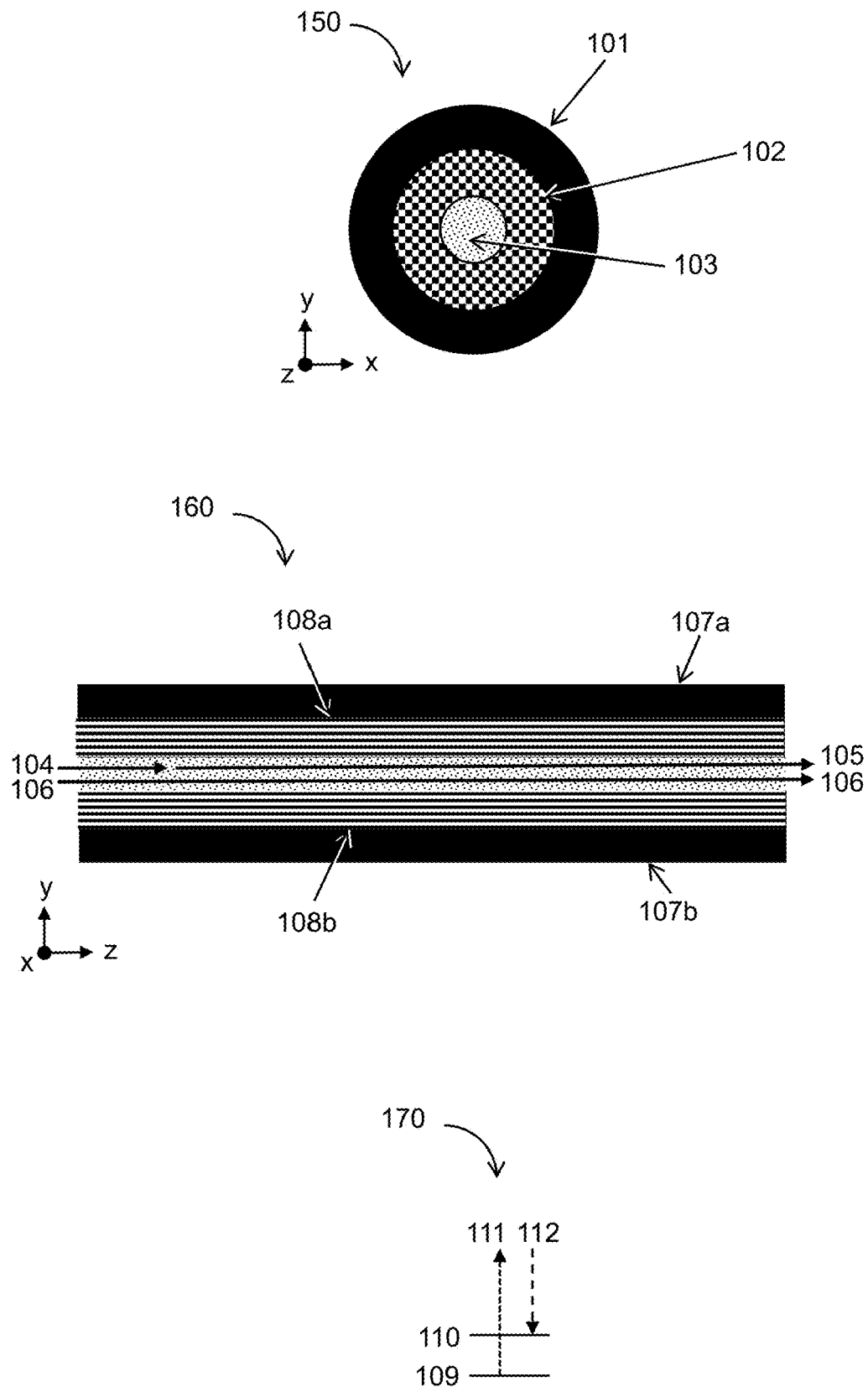
FIG. 1 schematically illustrates a hollow optical fiber and laser beams transmitted therethrough.

The figures and components therein may not be drawn to scale. Various components of the figures described herein may not be drawn to scale.

DETAILED DESCRIPTION

While various embodiments of the inventions have been shown, and described herein, it will be obvious to those skilled in the art that such embodiments are provided by way of example only. Numerous variations, changes, and substitutions may occur to those skilled in the art without departing from the inventions. It should be understood that various alternatives to the embodiments of the inventions described herein might be employed. The various embodiments disclosed herein are combinable, as appropriate.

Terms such as "a," "an" and "the" are not intended to refer to only a singular entity but include the general class of which a specific example may be used for illustration. The terminology herein is used to describe specific embodiments in the present disclosure, but their usage does not delimit to the specific embodiments of the present disclosure. The term "includes" means includes but not limited to, the term "including" means including but not limited to, and the term "based on" means based at least in part on.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to." When ranges are mentioned (e.g., between, at least, at most, and the like) the endpoint(s) of the range is/are also claimed. For example, when the range is from X to Y, the values of X and Y are also claimed. For example, when the range is at most Z, the value of Z is also claimed. For example, when the range is at least W, the value of W is also claimed.

The conjunction "and/or" as used herein in "X and/or Y"—including in the specification and claims—is meant to include the options (i) X, (ii) Y, and (iii) X and Y, as applicable. The conjunction of "and/or" in the phrase "including X, Y, and/or Z" is meant to include any combination and any plurality thereof, as applicable. For example, it is meant to include the following: (1) a single X, (2) a single Y, (3) a single Z, (4) a single X and a single Y, (5) a single X and a single Z, (6) a single Y and a single Z, (7) a single X, a single Y, and a single Z, (8) a plurality of X, (9) a plurality of Y, (10) a plurality of Z, (11) a plurality of X and a single Y, (12) a plurality of X, a single Y and a single Z, (13) a plurality of X and a single Z, (14) a plurality of Y and a single X, (15) a plurality of Y, a single X, and a single Z, (16) a plurality of Y and a single Z, (17) a plurality of Z and a single X, (18) a plurality of Z, a single X, and a single Y (19) a plurality of Z and a single Y, (20) a plurality X and a plurality Y, (21) a plurality X and a plurality Z, (22) a plurality Y and a plurality Z, and (23) a plurality X, a plurality Y, and a plurality Z. The phrase "including X, Y, and/or Z" is meant to have the same meaning as the phrase "comprising X, Y, or Z."

When ranges are specified for an attribute, it is meant herein that the attribute may include the value specified at the end of the range. For example, when the attribute is of a value of at least about X, the attribute can be X, or any value greater than X. For example, when the attribute is of a value of at most about Y, the attribute can be Y, or any value smaller than Y. For example, when the attribute is of a value from V to Z, the attribute can be V, the attribute can be Z, or the attribute can be any value between V and Z.

The term "operatively coupled" or "operatively connected" refers to a first mechanism that is coupled (or connected) to a second mechanism to allow the intended operation of the second and/or first mechanism. The coupling may comprise physical or non-physical coupling. The non-physical coupling may comprise signal induced coupling (e.g., wireless coupling).

The phrase "is/are structured" or "is/are configured," when modifying an article, refers to a structure of the article that is able to bring about the referred result.

Fundamental length scale (abbreviated herein as "FLS") comprises any suitable scale (e.g., dimension) of an object. For example, an FLS of an object may comprise a length, a width, a height, a diameter, a spherical equivalent diameter, a diameter of a bounding circle, a diameter of a bounding sphere, a radius, a spherical equivalent radius, or a radius of a bounding circle, or a radius of a bounding sphere.

The term "allow" may comprise "facilitate," "enable," or "be configured to materialize."

Signal communication comprises optical communication such as through optical fibers. The signal communication may comprise short haul communication or long-haul communication. The short haul communication may comprise communication within a facility, or within a system. Short haul communication may comprise communication within a data center. Short haul communication may comprise communication within a facility network. Short haul communication may comprise communication in a computer such as a supercomputer. Long haul communication may comprise communication between facilities. Long haul communication may comprise communication relating to cellular networks such as $5^{th}$ generation (5G) cellular networks. The long-haul communication may be between two (e.g., distant)

facilities such as between two or more data centers. The locations may be geographically distant from each other. Distant locations may comprise separate locations on the same street, on the same city, on the same county, on the same state, on the same country, on the same island, or on the same continent. The term "distant" may comprise location disposed at different streets, different cities, different counties, different states, different islands, or different continents. The separate locations may be separated from each other by at least one geographical feature comprising a mountain, a hill, a desert, an iceberg, or a body of water. The body of water may comprise a river, a stream, a lake, a sea, or an ocean. In an example, at least a portion of the optical fiber is disposed on a mountain such as on a top of the mountain. In an example, at least a portion of the optical fiber is disposed on a floor of the body of water such as at a bottom of the ocean. The hollow fiber may comprise enhancer(s) disposed along the optical fiber, e.g., when the optical fiber is utilized for long haul transmission. The enhancer(s) may be operatively coupled with the optical fiber, e.g., using respective connector(s). The enhancers may comprise an amplifier or a repeater. The repeater may be an amplifier. The enhancer may be an external device coupled with the optical fiber. The enhancer may comprise a semiconductor doped fiber amplifier. The enhancer may comprise an Erbium doped fiber amplifier (EDFA), the enhancer may comprise a semiconductor. The enhancer may comprise use (e.g., employment) of SRS such as SC-SRS. The enhancer may allow for localized amplification, e.g., with respect to the fiber utilized for communication of the signal. The enhancer may be a standalone (e.g., discrete) enhancer. The enhancer may use (e.g., employ) local amplification. The enhancer may employ an amplification method different than distributed amplification along the communication fiber. The enhancer may comprise an optical fiber. The power density of the radiation propagating in the enhancer's optical fiber may be less than the respective power density propagating through the communication optical fiber. At least one FLS of the enhancer's fiber may be less (e.g., smaller) than the respective FLS of the optical fiber utilized for communication, e.g., long haul communication. In an example, the length of the enhancer's optical fiber is less (e.g., shorter) than the length of the communication fiber (e.g., the interconnected media). In an example, the diameter of the enhancer's optical fiber is less (e.g., smaller) than the diameter of the communication optical fiber (e.g., the interconnected media). Less may be by at least about 0.25, 0.5, 1, 2, 3, 4, 5, 6, or 7 orders of magnitude. Less may be by any value between the aforementioned orders of magnitudes, e.g., from 0.25 to 7, from 0.25 to 2, from 1 to 5, or from 4 to 7.

FIG. 1 shows in 150 a vertical XY cross sectional example of a hollow optical fiber having a hollow interior 103 also referred to as "core", a shell 101 also referred to as "jacket," and an optional area 102 comprising optical crystal(s) and/or tubular structures (e.g., channels) disposed off the central long axis of the fiber, which area 102 is also referred to as "cladding." FIG. 1 shows in 160 a vertical YZ cross sectional example of the hollow optical fiber in 150, having the shell 107*a-b*, the optional area 108*a-b* comprising the optical crystal(s) or the tubular structures (e.g., channels) disposed off the central long axis of the fiber. In the hollow interior of the fiber example shown in 160, a signal carrying beam (Stokes beam) 106 propagates from one end of the fiber to its opposing end; a pump beam 104 that excites a medium in the hollow of the fiber, and Raman emission 105 (e.g., Raman scattering) propagating through the fiber, e.g., that can enhance Stokes beam 106 provided it has (e.g., substantially) the same wavelength. FIG. 1 shown in example 170 a ground state 109 of a molecule, which is excited by a pump laser beam to energy level 111 and relaxes by emitting energy 112 (by Raman scattering) to reach energy state 110. The optical crystal and/or tubular structures may be (e.g., symmetrically) arranged about the central long axis of the optical fiber. The symmetry may comprise rotational symmetry (e.g., $C_2$, $C_3$, $C_5$) about the central optical fiber axis, inversion symmetry, or mirror symmetry. The tubular structures (e.g., the nested capillaries) may be nested or non-nested tubular structures. In an example, at least one tubular structure is a nested tubular structure comprising one or more (e.g., further nested) tubular structure. In an example, one tubular structure is nested within another tubular structure. In an example, a first tubular structure is nested within a second tubular structure that is nested with in a third tubular structure. The tubular structure(s) are elongated in the direction of signal transmission. The tubular structure may be arranged in a crystalline arrangement. The tubular structure may or may not be part of an optical crystal. In some embodiments, the optical crystal may comprise cavities. The cavities may or may not be a tubular structure. The optical crystal may be devoid of a tubular structure. The optical fiber may comprise any optical fiber disclosed in the Fokoua et al. reference disclosed herein, which is incorporated herein by reference in its entirety.

In some embodiments, the signal communication in optical fibers may experience loss during transmission. The loss may comprise intrinsic loss or extrinsic loss. The intrinsic loss may comprise losses intrinsic to transmission of the signal in the optical fiber. The intrinsic loss may comprise Reyleigh scattering, scattering due to impurities in the optical fiber medium. The intrinsic loss may comprise propagation loss, which comprises the loss of the signal as it propagates within the optical fiber. The extrinsic loss may comprise losses associated with components connected to the optical fiber. The component may comprise another optical fiber such as connecting fiber, or components other than another optical fiber. The extrinsic loss may comprise Insertion loss associated with components connected to the optical fiber, e.g., at its ends. The loss from transmission to receipt of the signal may be at least about 0.01, decibel (dB), 0.02 dB, 0.05 dB, 0.07 dB, 0.1 dB, 0.25 dB, 0.5 dB, 0.7 dB, 0.8 dB, 0.9 dB, 1 dB, 2 dB, 3 dB, 4 dB, or 5 dB. The loss from transmission to receipt of the signal may be at most about 0.2 dB, 0.4 dB, 0.05 dB, 0.07 dB, 0.1 dB, 0.5 dB, 0.7 dB, 0.8 dB, 0.9 dB, 1 dB, 2 dB, 3 dB, 4 dB, 5 dB, or 6 dB. The loss from transmission to receipt of the signal may be between any of the aforementioned values, e.g., from about 0.01 dB to about 6 dB, from about 0.01 dB to about 0.04 dB, from about 0.2 dB to about 0.7 dB, from about 0.05 dB to about 2 dB, or from about 1 dB to about 5 dB. The loss from transmission to receipt of the signal may be at least about 0.5%, 1%, 5%, 10%, 20%, or 40% of the transmitted signal. The loss from transmission to receipt of the signal may be at most about 5%, 10%, 20%, 35%, or 50% of the transmitted signal. Relative to the transmitted signal, the loss from transmission to receipt of the signal may be between any of the aforementioned values, e.g., from about 0.5% to about 50%, from about 0.5% to about 10%, or from about 5% to about 50%. The hollow fiber may be configured to transmit electromagnetic beam(s) having a (e.g., total) peak power cross section greater than solid core fiber. Greater may be by at least 0.5, 1, 1.5, 2 or 2.5 orders of magnitude. The hollow fiber may be configured to transmit electromagnetic beam(s) having a (e.g., total) peak power (e.g. FIG. 2, 207) cross section of at least about 1 Giga Watts per square centimeter ($GW/cm^2$), 2.5 $GW/cm^2$, 5 $GW/cm^2$, 6G $GW/cm^2$, 7.5 $GW/cm^2$, or 9 $GW/cm^2$. The hollow fiber may be configured to transmit electromagnetic beam(s) having a peak power cross section of at most about 2.5 $GW/cm^2$, 5 $GW/cm^2$, 6G $GW/cm^2$, 7.5 $GW/cm^2$, or 10 $GW/cm^2$. The hollow fiber may be configured to transmit electromagnetic beam(s) having a peak power cross section between any of the aforementioned values, e.g., from about 1 $GW/cm^2$ to about 10 $GW/cm^2$, from about 1 $GW/cm^2$ to about 6 $GW/cm^2$, or from about 5 $GW/cm^2$ to about 10 $GW/cm^2$. The power cross section may be (a) of the pump laser beam, (b) of the signal carrying laser beam (Stokes laser beam), (c) of the Stokes laser beam and the Raman radiation, or (d) any combination of (a) (b) and (c). The loss may comprise extrinsic loss or extrinsic loss. The components may be associated (e.g., components of) a Terminal Transmission Equipment, also referred to herein as "TTE." The components may comprise protection elements. The protection elements may comprise an optical switch or an optical coupler. The TTE may comprise components in a transmitting end or components in a receiving end. The components in a transmitting end may comprise signal transmitter(s) or post-amplifier(s). A signal transmitter may be paired with a post amplifier. The components in a receiving end may comprise pre-amplifier(s) or receiver(s). A pre-amplifier may be paired with a receiver. There may be one or more redundant components in a TTE system. For example, redundant signal transmitters, redundant post-amplifiers, redundant pre-amplifiers, redundant receivers, or any combination thereof. The protection element, such as the optical switch, may select the transmitter-reiver pair. The protection element, such as an optical coupler, may select the amplifier receiver pair. In some embodiments, elimination of one or more of the connection elements in a TTE contributes to a reduction in signal loss. The receiver may be configured to utilize a signal beam having a power of at least about 0.25 micro-Watt ($\mu W$), 0.5 $\mu W$, 1 $\mu W$, or 1.5 $\mu W$.

In some embodiments, the signal is transmitted through a hollow optical fiber. Solid core optical fibers can be currently used for communication signal transmission, e.g., silica solid core fibers. Raman signal amplification (e.g., SRS) has been used in such solid core fibers (referred to herein also as "SC-SRS"). At times, hollow core fiber is used in at least a portion of the solid core fiber, e.g., instead of the solid core fiber. The hollow fiber may comprise a Hollow Core Photonic Bandgap Fiber (HC-PBGF), a Nested Anti-resonant Nodeless Fiber (NANF), a Double Nested Anti-resonant Nodeless Fiber (DNANF), an Anti-Resonant Fiber (ARF), or a capillary hollow fiber. The ARF may comprise a Double-Clad Anti-Resonant Fiber (DC-ARF). The hollow fiber may comprise Bragg fiber. The hollow fiber may comprise Kagome fiber. The hollow fiber may comprise glass. The hollow fiber may comprise a photonic crystal. The hollow fiber may be different from one comprising photonic crystal(s). The hollow fiber may be devoid from photonic crystal(s). The hollow fiber may comprise silica ($SiO_2$), Arsenic triselenide ($As_2Se_3$), poly(etherimide) (PEI), or poly(ether sulfone) (PES). The hollow fiber may comprise fused silica or a chalcogenide. The chalcogenide may comprise a sulfide, a selenide, a telluride, or a polonide. The fiber may comprise metallic mirror(s). The optical fiber may or may not exclude oxygen. The optical fiber may comprise chalcogenide glass. The hollow fiber may be a single mode fiber or a multi-mode fiber. The hollow fiber may comprise annular tubes surrounding the core. The gas may be disposed (a) in the core and/or (b) in the surrounding tubes if present. During operation, the gas in the hollow fiber may be at least at one ambient environmental condition of the ambient environment external to the optical fiber. The ambient environmental condition may comprise pressure or temperature. During operation, the gas in the hollow fiber may be at least at an ambient pressure of the ambient environment external to the optical fiber. For example, the gas in the hollow fiber may be at an ambient pressure. During operation, the gas may be at an ambient environmental condition(s) of the ambient environment external to the optical fiber. The ambient environment may comprise planes, mountains, sea, or ocean. For example, the ambient environment may be of a high low-pressure mountainous environment. For example, the ambient environment may be of a high pressure prevailing at the bottom of the ocean. During operation, the pressure of the media (e.g., gas) in the hollow fiber may be at least about 0.3 atmospheres (Atm), 0.5 Atm, 0.8 Atm, 1 Atm, 1.5 Atm, 5 Atm, 10 Atm, 100 Atm, 500 Atm, 800 Atm, or 900 Atm. During operation, the pressure of the media (e.g., gas) in the hollow fiber may be at most about 1.1 Atm, 1.5 Atm, 5 Atm, 10 Atm, 100 Atm, 300 Atm, 500 Atm, 800 Atm, 900 Atm, or 1000 Atm. During operation, the pressure of the media (e.g., gas) in the hollow fiber may be in the range from about 0.3 Atm to about 1000 Atm, from about 0.3 Atm to about 1.5 Atm, from about 0.9 Atm to about 300 Atm, or from about 0.9 Atm to about 1000 Atm. During use, the pressure in the optical fiber may (e.g., substantially) equilibrate to the pressure at the ambient environment. During operation, the pressure of the media (e.g., gas) in the hollow fiber may (e.g., substantially) equilibrate to the pressure at the ambient environment. During operation, the state of matter of the media (e.g., gas) in the hollow fiber may remain the same, e.g., in the requested operational pressure and temperature range. During operation, the temperature of the media (e.g., gas) in the hollow fiber may be at least about $-100°$ C., $-90°$ C., $-70°$ C., $-50°$ C., $-30°$ C., $0°$ C., $30°$ C., $50°$ C., $70°$ C., $90°$ C. or $100°$ C. The temperature of the media (e.g., gas) in the hollow fiber may be in the range from about $-100°$ C. to about $100°$ C., from about $-90°$ C. to about $90°$ C., from about $-70°$ C. to about $70°$ C., or from about $-40°$ C. to about $40°$ C. During use, the temperature in the hollow of the optical fiber may (e.g., substantially) equilibrate to the pressure at the ambient environment. During use, the environmental condition(s) in the hollow of the optical fiber may (e.g., substantially) equilibrate to the respective ambient environmental condition(s) at the ambient environment external to the optical fiber. The hollow fiber may be capped at its ends. The cap may comprise glass. The cap may comprise a material of the optical fiber. The cap may comprise silica ($SiO_2$), or Arsenic triselenide ($As_2Se_3$). The cap may comprise a material different than that of the optical fiber. The cap may comprise zinc sulfide (ZnS) or zinc selenide (ZnSe). The cap may comprise an optical window. The cap may comprise sapphire. The hollow optical fiber may be coiled or non-coiled. The hollow fiber may comprise at least one bent region and be non-coiled. The hollow optical fiber may be (e.g., substantially) linear such as straight. In hollow core fiber (without using the HC-SRS methodology), the attenuation of the pump beam may be attenuated to a greater extent as compared to solid core fibers, e.g., silica solid core fibers. The medium of the solid core fiber may have a larger dispersion coefficient as compared to a gas medium of the hollow core fiber, the gas being any gas disclosed herein utilized in the hollow fiber as a medium for signal transmission, e.g., dry air or nitrogen.

In another aspect, the interior of a hollow optical fiber is utilized as a signal amplifier. In some embodiments, such utilization comprises exciting gaseous members (e.g., gas molecules or gas atoms) in the hollow interior by a first laser referred to herein as a "pump laser," which gaseous members subsequently emit radiation at a frequency of a second laser carrying a signal and referred to herein as a "Stokes laser," thus causing amplification of the signal. Such signal amplification facilitates reduction in signal loss as compared to signal transmission that does not utilize such signal amplification methodology. The reduction in loss may comprise a reduction in internal loss comprising reduction in propagation loss. The use of the hollow fiber, with or without the signal amplification methodology disclosed herein, may reduce latency time as compared to optical signal propagating through a solid core optical fiber. As compared to solid core fibers (e.g., with and/or without use of SC-SRS), the latency in the hollow core fiber may be reduced by at least about 15%, 20%, 25%, 30%, 40%, 45%, 47%, 50%, or 60%. As compared to solid core fibers (e.g., with and/or without use of SC-SRS), the latency in the hollow core fiber may be reduced by any percentage value between the aforementioned percentage values, e.g., from about 15% to about 60%, from about 30% to about 60%, or from about 40% to about 50%. The latency may be measured from signal transmission to signal receipt, e.g., from the receiver to the transmitter. Such signal amplification methodology may reduce (e.g., eliminate) use of one or more external components (e.g., protection elements) associated with optical fiber signal transmission. For example, use of such amplification methodology may reduce (e.g., eliminate) usage of signal amplifiers comprising post-amplifiers or pre-amplifiers. Such signal amplification methodology may facilitate increasing a distance between immediately adjacent enhancers such as repeaters along the communication route, e.g., thus reducing the number of enhancers required to operatively couple with the optical fiber for the signal transmission, with two immediately adjacent enhancer excluding another enhancer disposed therebetween along the communication route. At least two of the enhancers may be of the same type. At least two of the enhancers may be of a different type. The increase in the distance between immediately adjacent enhancers may be by at least about 10%, 25%, 50%, or 75%, as compared to currently used signal transmission methodologies disclosed herein. In solid core fiber SRS (also herein, SC-SRS), the silica bond vibration may be utilized for the Raman amplification. In some embodiments, the hollow fiber has at least one hollow channel disposed within and along the length of the optical fiber. The hollow fiber may comprise a medium having a material having a refractive index of at most about 1, 1.005, 1.05, 1.1, 1.2, or 1.3 at ambient conditions, e.g., air at standard temperature of pressure. The hollow channel may comprise gas, liquid, or semisolid (e.g., gel). The gas may comprise nitrogen ($N_2$), oxygen ($O_2$), carbon dioxide ($CO_2$), or ethane ($C_2H_6$). The gas may comprise air such as ultra dry air, e.g., ultra-pure air. The gas may be devoid of a polar molecule such as water, e.g., to a measurable and/or detectable degree. For example, the gas is devoid of water, e.g., to a measurable and/or detectable degree. The gas may comprise a non-polar gas. The gas may comprise hydrogen ($H_2$), deuterium ($D_2$), hydrogen deuteride (HD), or methane ($CH_4$). The gas may comprise any of the gases disclosed herein. In some instances, the gas may exclude hydrogen, deuterium, hydrogen deuteride, or methane. The gas may comprise a Noble gas, e.g., comprising dispersed atoms. The Noble gas may or may not comprise Xenon. The Noble gas may comprise Argon. The gas in the hollow fiber may be a mixture of gases, e.g., dry air. The mixture of gases may comprise any gas disclosed herein. In some embodiments, dry air is utilized as the gas media in the hollow fiber. The selection of the media occupying the hollow space of the hollow fiber may be selected based at least on practicality. Practicality may comprise ease of installation, manufacture, maintenance, cost, durability, or safety. The cost may comprise the cost of manufacturing, cost of installation, or cost of maintenance. The durability may be over a practical use of the product, e.g., at least about 5 years, 10 years, 20 years, or 50 years. The safety may comprise safety of the manufacturing, installation, maintenance personnel, or user. Practicality may comprise requirement for a working condition of the gas in the hollow fiber during use, the working condition comprising temperature or pressure. For example, a working condition that is an ambient condition may be more practical than a working condition different from ambient condition, with the greater the difference being more impractical. The hollow fiber may have a spectral range of at least about 300 nanometers (nm), 500 nm, 700 nm, 800 nm, 900 nm, 1000 nm, 1200 nm, or 1300 nm. The hollow fiber may have a spectral range between any of the aforementioned values, e.g., from about 300 nm to about 1300 nm, or from about 500 nm to about 800 nmm, or from about 500 nm to about 1300 nm.

In some embodiments, an optical fiber may comprise fiber portions operatively coupled to form the optical fiber, such as physically connected to form the optical fiber. Such optical fiber comprising optical fiber portions may be referred to as "complex optical fiber." In such optical fiber, at least one fiber portion may be (e.g., substantially) similar to one other fiber portion. In such optical fiber, at least one fiber portion may be different from at least one other fiber portion. The difference may be in the interior medium of the different fiber portions. For example, the different portions may be solid fibers of different solid interior material types. For example, the different portions may be hollow fibers of different interior media such as different gases. For example, the different portions may be by one being a solid core fiber and the other may be a hollow core fiber. One fiber portion end may be coupled with the other fiber portions beginning, the end and the beginning defined by the direction of signal transmission therethrough. In some embodiments, the hollow fiber is operatively coupled (e.g., physically connected) in one or more of its opposing ends to solid core fiber(s). For example, the hollow fiber may be a fiber portion embedded in a solid core fiber. For example, the optical fiber may comprise a first portion of a hollow fiber and a second portion of a solid core fiber. In some embodiments, the hollow fiber is operatively coupled (e.g., physically connected) in one or more of its opposing ends to another hollow core fiber. For example, the hollow fiber may be a fiber portion embedded in a solid core fiber. For example, the optical fiber may comprise a first portion of a hollow fiber and a second portion of a solid core fiber. While hollow fiber is referred to in other paragraphs herein, the hollow fiber in these paragraphs may or may not be a portion of a complex optical fiber.

In some embodiments the signal is amplified using Raman scattering. In some embodiments, Raman scattering uses inelastic scattering of photons characteristic of vibrational modes of media members comprising molecules or atoms. Thus, Raman scattering may be used to characterize such media members, e.g., such molecules. SRS may comprise (a) using a monochromatic light source (e.g., laser) to irradiate sample of the media members (e.g., molecules), the laser having a first energy, the laser interacting with the sample media members and causing light emission (e.g., scattering) at a second energy different from the first energy. Without wishing to be bound to theory, the light emission may be by inelastic scattering. In some embodiments, the second energy is lower than the first energy. The difference between the second energy and the first energy is referred to as the Raman shift, or Raman radiation. Such Raman shift is characteristic of the vibrational modes of the sample media members, e.g., sample molecules. When the Raman shift is (e.g., substantially) equal to a signal carrying laser, the signal may become amplified. Relative to the pump laser, the Raman shift may be of at least about 5 terra hertz (THz), 10 THz, or 15 THz. Relative to the pump laser, the Raman shift may be of at most about 10 THz, 15 THz, 20 THz, or 50 Tz. Relative to the pump laser, the Raman shift may be between any of the aforementioned values, e.g., from 5 THz to about 50 Tz, or from about 10 THz to about 20 THz. The Raman peak chosen for the HC-SRS amplification may be the most intense Raman radiation of the molecular media utilized. The Raman peak chosen for the HC-SRS amplification may be other than the most intense Raman radiation of the molecular media utilized. The wavelength of the Raman radiation chosen for the HC-SRS may be (e.g., substantially) equal to the wavelength utilized in signal communication such as telecommunication, which is the wavelength of the Stokes laser carrying the communication signal. The wavelength utilized in the signal communication may comprise O-band, E-band, S-band, C-band, L-band, or U-band. The wavelength utilized in the signal communication may be at least about 800 nm, 850 nm, 900 nm, 1260 nm 1300 nm, 1360 nm, 1460 nm, 1550 nm, 1565 nm, 1600 nm, 1675 nm, or 1700 nm. The wavelength utilized in the signal communication may be at most about 1260 nm 1300 nm, 1550 nm, 1625 nm, 1800 nm, or 1900 nm. The wavelength utilized in the signal communication may be between any of the aforementioned values, e.g., from about 800 nm to about 900 nm, from about 900 nm to about 1625 nm, from about 800 nm to about 1625 nm, from about 1625 nm to about 1360 nm, from about 1260 nm to about 1360 nm, from about 1360 nm to about 1460 nm, from about 1460 nm to about 1530 nm, from about 1530 to about 1565, 1530 nm to about 1625 nm, 1565 nm to about 1625 nm from 1625 to 1675, from 1675 to 1900, or from 1675 to 1900. The wavelength utilized in the signal communication may be (e.g., substantially) any of the aforementioned values, e.g., may be 850 nanometer (nm), 1300 nm, or 1550 nm. The wavelength utilized in the signal communication may comprise wavelength not (e.g., significantly, and/or measurably) attenuated by water, e.g., that may collect externally on the optical fiber.

In some embodiments, stimulated Raman scattering (SRS) is utilized in a hollow core optical fiber filled by sample media members (e.g., molecules) such as a gas-filled core of hollow core optical fiber. In some embodiments, SRS is used to effectively convert an (e.g., the entire) optical transmission line into a (e.g., coherent) Raman amplifier of the signal (e.g., signal pulse). The Raman amplifier may be a coherent Raman amplifier. Such amplification may effectively attenuate (e.g., offset) one or more losses such as one or more propagation losses, which would normally be present in the absence of this methodology or any of its components, such as in the absence of an SRS pump laser. Examples of signal amplification, hollow fibers, and signal transmission, can be found in F. County et al., *Subwatt Threshold cw Raman Fiber-Gas Laser Based on H2-Filled Hollow-Core Photonic Crystal Fiber*, Phys. Rev. Lett. 99, 143903 (2007), which is incorporated herein by reference in its entirety. In some embodiments, SRS comprises using two lasers with coincident polarization to excite a (e.g., specific) vibrational mode of a (e.g., specific) molecule. In some embodiments, the laser with a higher photon energy is called the pump laser and the laser with a lower photon energy is called the Stokes laser. In order to produce an amplified signal their photon energy differences satisfy (e.g., must satisfy) the energy requirement of a vibrational mode of the gas medium:

$$E_{Raman} = E_{pump} - E_{Stokes}$$

Where: $E_{Raman} = \hbar\Omega, E_{pump} = \hbar\omega, E_{Stokes} = \hbar\omega_{Stokes}$ In some embodiments, the intensity of the energy transfer in SRS from the pump energy (e.g., having a pump wavelength) to the Stokes energy (e.g., having a stokes wavelength) provides the amplification along the transmission line in the optical fiber, which stokes energy carries the pulse of the signal. The increase of power in the Stokes laser pulse may be called stimulated Raman gain, also referred to as "SRG." In some embodiments, Raman gain is an optical gain (amplification) arising from the stimulated Raman scattering. Raman gain can occur in transparent solid media (e.g., optical fibers), liquids and gases under the influence of pump radiation (e.g., pump light), and may be used in Raman amplifiers and/or Raman lasers. In some embodiments, the magnitude of the Raman gain depends on the optical frequency offset (e.g., in the terahertz region) between the pump wave(s) and the signal wave(s). As compared with laser gain e.g. in rare-earth-doped laser gain media, Raman gain (a) may require longer interaction lengths, (a) may have substantially different saturation characteristics, (c) may have a gain spectrum which depends on the wavelength of the pump light and the characteristics of the propagation medium, or (d) any combination of (a), (b), and (c).

In some embodiments, communication via the hollow core fiber is utilized with the SRS methodology disclosed herein, abbreviated as "HC-SRS." Using such communication methodology, the attenuation (e.g., loss) of a pump beam may be reduced as compared to (i) current optical communication using hollow optical fiber without using HC-SRS, (ii) using solid core optical fiber without SC-SRS, (iii) using solid core optical fiber with SC-SRS, or (iv) any combination of (i) (ii) and (iii), also herein "currently used signal transmission methodologies." Using such HC-SRS communication methodology, the signal attenuation may be at least about 5%, 10%, 25%, 50%, or 75% lower as compared to the currently used signal transmission methodologies disclosed herein. As compared to the currently used signal transmission methodologies disclosed herein, the reduced degree of attenuation in HC-SRS may be between any of the aforementioned values, e.g., from about 5% to about 75%, from about 5% to about 50%, from about 5% to about 25%, from about 10% to about 50%, or from about 25% to about 75%. The mathematical symbol "*" designates the operation of multiplication, or times. At its maximum, the extent of signal amplification by the HC-SRS methodology may be at least about 2%, 3%, 5%, 8%, or 10% of the power of the signal carrying beam (Stokes beam power). At its maximum, the extend of signal amplification of the Stokes beam by the HC-SRS methodology relative to the Stokes beam power may be any percentage between the aforementioned percentages, e.g., from about 2% to about 10%, from about 2% to about 5%, or from about 5% to about 10%. The attenuation of the signal transmission at standard temperature and pressure (STP) may be at most about 0.001 decibels per kilometer (dB/Km), 0.01, 0.02, 0.035 dB/Km, 0.05 dB/Km, 0.1 dB/Km, 0.15 dB/Km, 0.16 dB/Km, 0.2 dB/Km, 0.3 dB/Km, 0.35 dB/Km, 0.5 dB/Km, 1.0 dB/Km, 2.0 dB/Km, 5.0 dB/Km, 7.5 dB/Km, 8.5 dB/Km, 10 dB/Km, or 15 dB/Km. The attenuation of the signal transmission at standard temperature and pressure (STP) may be between any of the aforementioned values, e.g., from about 0.001 dB/Km to about 15 dB/Km, from about 0.01 dB/Km to about 0.15 dB/Km, from about 0.1 dB/Km to about 1.0 dB/Km, from about 1.0 dB/Km to about 5.0 dB/Km, or from about 1.0 dB/Km to about 15 dB/Km.

In some embodiments, the propagation extent (e.g., propagation distance) is greater in a hollow fiber as compared to solid core fiber, the propagation being of the pump laser beam(s) and/or of the signal carrying laser beam(s) (Stokes laser beam(s)). The propagation distance can be measured without using HC-SRS in the hollow fiber and without SC-SRS in the solid core fiber. In hollow core fibers devoid of at least one type of enhancer, the propagation of the signal carrying laser beam (e.g., Stokes beam) that can be detected (e.g., and demodulated and/or deciphered) can be at least about 300 kilometers (Km), 360 Km, 500 Km, 550 Km, 750 Km, 1000 Km, 1200 Km, 1500 Km, 1800 Km, 2000 Km, 2500 Km, or 3000 Km. The enhancers may comprise a repeater or an amplifier. The repeater may be an amplifier. In hollow core fibers devoid of at least one type of enhancer (e.g., devoid of repeaters), the propagation of the signal carrying laser beam (e.g., Stokes beam) that can be demodulated can be of any distance between the aforementioned distances, e.g., from about 300 Km to about 3000 Km, from about 300 Km to about 1000, from about 750 Km to about 2000 Km, or from about 1200 Km to about 3000 Km. The practical power range for beam transmission in the hollow fiber can be at least about 30 decibels (dB), 60 dB, 90 dB, or 120 dB. The practical power range for beam transmission in the hollow fiber can be any value between the aforementioned values, e.g., from 30 dB to about 120 dB, or from about 60 dB to about 120 dB. The practical power designates the power of the beam transmission in the hollow fiber is such that the beam does not experience substantial non-linear effects that would compromise transmission and/or demodulation of the signal transmitted through the hollow fiber. The power of the pump laser may be at least 0.5, 1, 2, or 2.5 orders of magnitude higher than that of the Stokes laser.

In some embodiments, the signal carrying laser beam (Stokes laser beam) and the pump laser beam propagate in the hollow fiber for signal communication. The Stokes laser beam and the pump laser beam may experience (e.g., substantially) similar extents of loss during the propagation. The Stokes laser beam and the pump laser beam may experience different extents of loss during the propagation. In a selected hollow fiber, the extent of loss of a laser beam may be dependent at least on characteristic(s) of the laser beam, e.g., the characteristic(s) comprising a wavelength, a frequency, or an amplitude. The Stokes laser beam may experience a lower extent of loss during propagation as compared to the loss experienced by the pump laser beam. For example, the pump laser beam may be non-detectable upon exit of the Stokes laser beam from the hollow fiber. For example, the extent of HC-SRS stimulated by the pump laser beam may diminish during propagation of the Signal through the hollow fiber. During propagation of the signal through the hollow fiber, the enhancement of the signal may experience a maximum degree of enhancement. During propagation of the signal through the fiber, the enhancement of the signal may experience a reduced degree of enhancement, e.g., after the maximum enhancement. The reduced degree of signal enhancement due to the HC-SRS, may be greater as the distance of the signal propagation through the fiber increases. The enhancement of the signal may diminish as the distance of the signal propagation through the fiber increases. The enhancement of the signal may diminish as the distance of the pump propagation through the fiber increases. The loss in the signal enhancement may be due at least in part to the attenuation (e.g., loss) experienced by the pump at that propagation distance. The loss in the signal enhancement may be due at least in part to the attenuation (e.g., loss) experienced by the Stokes laser beam at that propagation distance. In some examples, the attenuation of the pump laser is such that it causes HC-SRS (e.g., substantially) equaling the internal (e.g., propagation loss) of the Stokes laser, causing the signal to experience a loss that is minimal, insubstantial, inconsequential, and/or non-measurable. In an example, while using HC-SRS the power of the signal remains (e.g., substantially) the same as it propagates through the hollow fiber from its entry to its exit.

Figure 2:
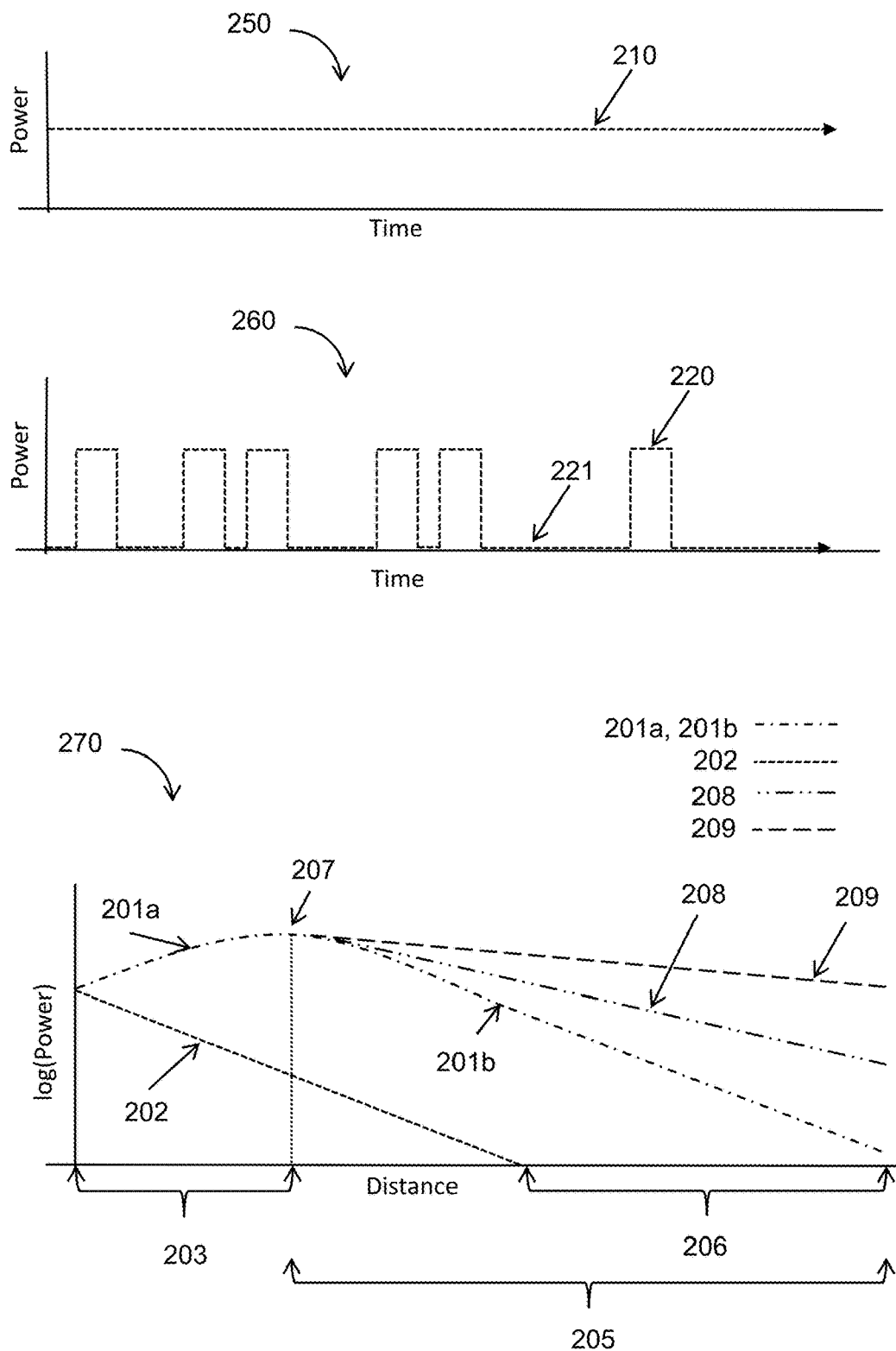
FIG. 2 schematically illustrates graphs depicting laser beam powers as a function of time, and laser beam powers as a function of distance.

FIG. 2 shows in example 250 a continuous wave pump laser having power 210 as a function of time of irradiation, e.g., and transmission. FIG. 2 shows in example 260 a signal (e.g., carried by the Stokes laser beam) having pulses such as pulse 220 having a power, and intermissions such as 221, constituting the signal transmitted, the pulses and intermissions depicted by their poser as a function of time of irradiation, e.g., and transmission. FIG. 2 shows in example 270 a signal propagating through a hollow fiber devoid of an external enhancer(s) (e.g., amplifier and/or repeater). The power is depicted as a logarithmic scale. During propagation in the hollow fiber, beam 202 experiences internal loss (e.g., propagation loss) depicted in this example as a reduction in power, the beam 202 not experiencing HC-SRS amplification. Beam 201a experiences enhancement in power, the enhancement peaking at 207 as a result of HR-SRS using a pump beam co-propagating with the Stokes beam, the pump beam giving rise to co-propagating Raman radiation that amplifies the signal. The signal amplification peaking at 207 occurs at distance 203 at least in part due to the pump's exciting the media members (e.g., molecules) of a media member type disposed in the hollow of the fiber, the media members of the type (e.g., nitrogen gas) subsequently emit the Raman scattering at the wavelength of the Stokes beam carrying the signal to be transmitted. The pump beam becomes attenuated (e.g., experiences loss) as it continues to propagate along and through the hollow fiber at distance 205, e.g., due to properties of the hollow fiber, causing the extent of HC-SRS to diminish. Consequently, the signal experiences a lesser degree of enhancement. The signal thus attenuates while the signal continues to propagate along the fiber at distance 205, e.g., at least in part due to internal loss. The degree of signal attenuation may depend at least in part on the degree of HC-SRS stimulated by the pump laser as the signal propagates along the fiber. The degree of signal attenuation may depend at least in part on the directionality of the pump beam with respect to the signal carrying beam, e.g., co-propagating or counter-propagating. In the example shown in 270, a co-propagating pump beam is utilized. The degree of signal attenuation may depend at least in part on the degree of pump laser attenuation during its propagation through the hollow fiber. Numerals 201a and 201b collectively designate a situation in which (a) the pump beam is incapable of effectuating HR-SRS to a degree that substantially enhances the signal, while (b) the signal experiences a loss in a similar manner to 202, causing the signal to maximally enhance at 207 after propagating a distance 203;

consequently, the HR-SRS extents the propagation distance of the signal by a distance 206. Portion 201a designates a portion of the signal traveling along distance 203 in the hollow fiber, and portion 201b designates a portion of the signal traveling along distance 205 in the hollow fiber. The signal carried by the enhanced Stokes beam 201a-201b can reach a longer distance 206 as compared to the distance reached by beam 202 that did not experience enhancement by HC-SRS. Numeral 208 designates a situation in which (a) the pump beam effectuates HR-SRS to a diminished extend as it propagates along the fiber and (b) the signal experiences a loss in a similar manner to 202; consequently, the HR-SRS extents the propagation distance of the signal by a distance greater than 206 while causing the signal 201a to maximally enhance at 207 after propagating a distance 203. Numeral 209 designates a situation in which (a) the pump beam effectuates HR-SRS to a diminished extend as it propagates along the fiber, the diminished extent being lower than in the example of 208, and (b) the signal experiences a loss in a similar manner to 202; consequently, the HR-SRS extents the propagation distance of the signal by a distance greater than 206 and greater than in the example of 208 while causing the signal 201a to maximally enhance at 207 after propagating a distance 203. Signal propagation examples 201b, 208, and 209, show different scenarios of signal attenuation as the signal propagates along hollow fiber portion 205, depending at least in part on the attenuation of the pump beam utilized for HC-SRS in the fiber.

In some embodiments, the SRS in hollow fiber (HC-SRS) mimics at least a portion of the internal loss experienced by the signal during its transmission through the hollow fiber. For example, the HC-SRS may offset (e.g., compensate for) at least a portion of the preparation loss. In some embodiments, a greater beam intensity (e.g., beam having a greater power) may be transmitted through the hollow fiber as compared to the solid core fiber, with greater being at least about 5 times (*), 10*, 15*, or 20* as compared to the beam power used for transmission through a solid core fiber. In some embodiments, a lower beam intensity (e.g., beam having a lower power) may be transmitted through the hollow fiber as compared to the solid core fiber, with lower being at most about 0.1 times (*), 0.25*, 0.5*, 0.75*, or 0.9*, as compared to the beam power used for transmission through a solid core fiber. The pump laser utilized in the hollow core transmission application may have a power of at least about 50 milli Watts (mW), 100 mW, 500 mW, 750 mW, 1 Watt (W), 5 W, 10 W, 15 W, 20 W, 25 W, or 50 W. The pump laser may have a value between any of the aforementioned values, e.g., from about 50 mW to about 50 W, from about 50 mW to about 750 mW, from about 100 mW to about 20 W, or from about 1 W to about 50 W. The enhancement of the signal carrying beam (Stokes beam) due to SRS at its maximum (e.g., FIG. 2, 207) may be at least about 0.05 decibel (dB), 0.1 dB, 0.25 dB, 0.5 dB, 0.7 dB, 0.8 dB, 0.9 dB, 1 dB, 2 dB, 3 dB, 4 dB, or 5 dB as compared to the Stokes beam on its transmission. Relative to the transmitted signal carrying laser beam (Stokes laser beam), the enhancement of the Stokes beam due to HC-SRS at its maximum (e.g., 207) may be at most about 0.5 dB, 0.7 dB, 0.8 dB, 0.9 dB, 1 dB, 2 dB, 3 dB, 4 dB, 5 dB, or 6 dB. Relative to the transmitted Stokes laser beam, the enhancement of the Stokes beam due to HC-SRS at its maximum (e.g., 207) may be between any of the aforementioned values, e.g., from about 0.05 dB to about 6 dB, from about 0.05 dB to about 2 dB, or from about 1 dB to about 5 dB. Relative to the transmitted Stokes laser beam, the enhancement of the Stokes beam due to HC-SRS at its maximum (e.g., 207) may be at least about 0.5%, 1%, 5%, 10%, 20%, or 40% of the transmitted signal. Relative to the transmitted Stokes laser beam, the enhancement of the Stokes beam due to HC-SRS at its maximum (e.g., 207) may be at most about 5%, 10%, 20%, 35%, or 50% of the transmitted signal. Relative to the transmitted Stokes laser beam, the enhancement of the Stokes beam due to HC-SRS at its maximum (e.g., 207) may be between any of the aforementioned values, e.g., from about 0.5% to about 50%, from about 0.5% to about 10%, or from about 5% to about 50%. The HC-SRS methodology may utilize pump beam co-propagating with the Stokes beam, and/or pump beam counter-propagating with the Stokes beam. The HC-SRS methodology may utilize Raman radiation co-propagating with the Stokes beam, and/or Raman radiation counter-propagating with the Stokes beam.

In some embodiments, a hollow optical fiber is utilized, which hollow comprises gas. The gas may be a non-polar gas, the gas may comprise nitrogen. The gas may comprise any gas disclosed herein. The pump laser may be a (e.g., narrow band) continuous wave laser, or any pump laser disclosed herein. The Stokes laser radiation may have a lower frequency than the pump laser radiation. The Stokes laser may be any Stokes laser disclosed herein. In an example, for the case of a nitrogen-filled, hollow core, fiber optic transmission line, the quasi-continuous interaction between a narrow-band CW pump laser and a Stokes-shifted signal pulse (with a lower optical frequency) via stimulated Raman scattering can be described with the following coupled differential equations:

$$\frac{\partial I_s}{\partial z} = g_R I_p I_s$$

$$\frac{\partial I_p}{\partial z} = \frac{v_p}{v_s} g_R I_p I_s$$

where $I_p$ and $I_s$ are the optical intensities (with units of W/m2), and $v_p$ and $v_s$ the optical frequencies of the two laser beams, and $g_R$ is the Raman gain coefficient, which in this example is e.g. of the order of 1.13×10-13 m/W for the first Stokes (S1) Raman gain coefficient of nitrogen ($N_2$) at the optimum frequency offset of roughly 2330 cm−1. In this example, the equations show that the Stokes pulse (~1550 nm) experiences a gain coefficient galp, whereas the pump (~1138 nm) loses more energy than is transferred to the Stokes wave. This lost optical energy may be (e.g., effectively) converted into heat.

In some embodiments, strong Raman conversion requires many meters of fiber when the optical powers are limited to a few watts. Such requirement may be due to the rather low value of the Raman gain coefficient, e.g., as compared to that of EDFA. Such gain can be adjusted through the (e.g., proper) selection of pump laser power as a function of transmission length, e.g., to offset linear propagation losses. In some embodiments, the hollow fiber is a polarization maintaining fiber. In some embodiments, when the hollow fiber is polarization maintaining, the polarization of the pump beam and of the signal carrying beam (Stokes beam) should be along one of the main directions of the polarization maintaining fiber, e.g., and their polarization should be aligned relative to each other to maximize the Raman gain. The alignment can be parallel or perpendicular. In some embodiments, a beam propagating through the hollow fiber experiences birefringence. Without wishing to be bound to theory, the birefringence may be due to imperfections in the structure of the fiber and/or structural imperfections in the internal propagation space. In some embodiments, the hollow core fiber has a birefringence, e.g., has a refractive index dependent on the polarization and propagation direction of the transmitted beam through the fiber. In some embodiments, the Raman radiation preserves the polarization of the pump beam stimulating it. The Stokes beam polarization can be (e.g., substantially) similar to that of the pump beam. Circular polarization in one or both pump and Stokes beams can be used to optimize (a) the coherent mixing overlap and/or (b) the coherent mixing addition, of the Stokes beam and the Raman emission (e.g., Raman scattering), e.g., in the case where the hollow core fiber has a birefringence variance (e.g., that is substantial, measurable, or meaningful for the signal transmission) between the pump beam characteristic and Stokes beam characteristic. The beam characteristic may comprise wavelength or frequency. In some embodiments, when there is birefringence in the fiber in either the pump beam characteristic or the Stokes beam characteristic (e.g., the signal beam characteristic), a circular polarization for both the pump radiation and the signal radiation, is used. In some embodiments, the pump laser beam is of a depolarized state—the pump laser beam is not polarized.

In an example, a system design utilizing such concept is depicted below. A hollow-core transmission fiber, filled with nitrogen (e.g., or air such as ultra-clean air), is pumped by a 1138 nm (pump wavelength) continuous wave (CW) laser. A Stokes laser at 1550 nm (Stokes wavelength) carrying the signal is combined with the pump laser through an optical coupler such as a wavelength-division multiplexer (WDM) and carries the optical communication information. The optical communication may be carried in any number of possible modulation modalities comprising amplitude modulation (AM), frequency modulation (FM), polarization modulation, phase modulation, or the like. The signal laser pulses may be amplified, e.g., as described above. Such amplification may attenuate (e.g., reduce, eliminate, or offset) one or more of the losses (e.g., such as the propagation losses) normally experienced in the absence of using the HC-SRS methodology, e.g., in the absence of the pump laser. For transmission lines with multiple signal wavelength channels, (a) multiple pump lasers can be used, and/or (b) a broad-spectrum pump, such as a Fabry-Perot laser, can be utilized to cover the spectral range required to satisfy the SRS conditions. The optical coupler may also act as an optical decoupler.

FIG. 3 shows an example of a block diagram of a method disclosed herein. In block 301, providing a hollow fiber comprising a media disposed in at least a portion of a hollow space of the hollow fiber, the media comprising media members, the media members being dispersed, the media members comprising (e.g., gas) molecules or atoms, the hollow fiber having a first end and a second end opposing the first end, the hollow fiber being configured for transmission of a (e.g., communication) signal therethrough from the first end to the second end, the signal comprising electromagnetic radiation. In block 302, transmitting a first (e.g., pump) laser beam into (e.g., and through) the hollow fiber and exciting at least one member of the media members such that the at least one member excited by the first laser beam emits Raman radiation upon relaxation, the Raman radiation having a second wavelength. In block 303, modulating a second (e.g., Stokes) laser beam to carry a signal utilized for communication and transmitting the second laser beam through the hollow fiber, the second laser beam carrying the signal being enhanced by the Raman radiation having the second wavelength, the second laser beam being enhanced during its propagation through the hollow fiber. Operations 302 and 303 can be carried out in a concerted manner, e.g., simultaneously, in tandem, together, or at the same time.

FIG. 4 shows an example of a block diagram of a method disclosed herein. In block 401, using a first (e.g., pump) energy beam to excite a medium member (e.g., gas member such as a gas molecule) of a hollow fiber, the medium member consequently emitting Raman radiation at a wavelength; and transmitting through the optical fiber a second (e.g., Stokes) energy beam having the wavelength, the second energy beam carrying a signal to be communicated, the second energy beam being amplified by the Raman radiation in the hollow fiber. Transmission of the first energy beam and of the second energy beam can be carried out in a concerted manner, e.g., simultaneously, in tandem, together, or at the same time. In block 402, Optionally (a) detecting the first energy beam exiting the fiber and/or (b) detecting the second energy beam exiting the fiber. In block 403, optionally filtering the beam having the wavelength after it exits from the fiber, the beam comprising the second laser bean and the Raman radiation. Operations 402 and 403 can be performed at any order. In block 404, detecting the signal carried by the beam having the wavelength, after the beam exits the hollow fiber, the beam comprising the second laser bean and the Raman radiation.

In some embodiments, two laser beams emit radiation into an optical fiber. The optical fiber may or may not be a complex optical fiber, as disclosed herein. The first laser beam may be configured to irradiate sample media members (e.g., molecules) embedded in the optical fiber to generate Raman scattering. In some embodiments, the Raman scattering is of a wavelength (e.g., substantially) equal to a second laser beam propagating through that optical fiber. The sample media members may be embedded in the hollow of the optical fiber. The first laser beam—the pump beam—may have a wavelength of at least about 900 nanometers (nm), 980 nm, 1138 nm, 1300 nm, or 1480 nm. The first laser beam may have a wavelength between any of the aforementioned wavelengths, e.g., from about 900 nm to about 1480 nm. The first laser may be referred to herein as the pump laser. During use, the first laser beam may irradiate as a continuous wave. The pump laser may be a (e.g., narrow band) continuous wave laser. The pump laser may be a pulse laser. The pump laser may be a quasi-continuous wave (QCW) laser, e.g., which operates in a pulsed mode, the pulses being long to approximate a CW laser for the intended purpose of the signal transmission. Long may be at least at a microsecond range, or at a millisecond range. The pulsed mode of the QCW may be at a high frequency as compared to a pulsed laser, e.g., at a range of kilohertz. The pump laser may be adjusted from being a continuous wave laser to being a pump laser, e.g., depending on the duty cycle utilized during operation. In an example, the pump laser (e.g., substantially) maintains its energy output by switching a continuous wave mode having a first beam amplitude to a pulsing mode, the pulses having an enhanced amplitude as compared to the CW mode averaging at (e.g., substantially) the same energy as the CW mode. The pump laser may be tunable, e.g., an Ytterbium laser. The pump laser may be an infrared (IR) laser. The pump laser may be a rare-earth doped laser. The pump laser may be a Neodymium YAG (Nd: YAG) laser. The pump laser may be a diode laser. The pump laser may be a narrow band continuous wave laser. The choice of laser and/or laser operational mode (e.g., pulsed, CW, or QCW) may depend at least in part on thermal load, thermal lensing, stress induced birefringence, damage from overheating, or any combination thereof.

The second laser beam may have a wavelength (e.g., substantially) equal to the Raman scattering wavelength. The second laser may be referred to as the Stokes laser. The second laser beam may have a wavelength substantially equal to a wavelength in which the solid medium of the optical fiber is (e.g., substantially) transparent. The solid medium may comprise silicon or glass. The Stokes laser may have a wavelength of at least about 1000 nanometers (nm), 1300 nm, 1500 nm, 1550 nm, 2000 nm, or 2500 nm. The Stokes laser may have a wavelength between any of the aforementioned wavelengths, e.g., from about 1000 nm to about 2500 nm. The Stokes laser may be a pulse laser. The Stokes laser may be tunable, e.g., an Ytterbium laser. The Stokes laser may be an infrared (IR) laser. The Stokes laser may be a rare-earth doped laser. The Stokes laser may be a diode laser. The Stokes laser may be a narrow band laser. The Stokes laser may be a semiconductor laser.

In some embodiments, the power of one or more of the laser beams is adjusted. The power adjustment may depend at least in part on the FLS (e.g., length) of the optical fiber and/or of the signal transmission path.

In some embodiments, more than one signal carrying beam (Stokes beam) may be transmitted in the optical fiber. In some embodiments, a plurality of Stokes channels may be operatively coupled (e.g., connected) to the optical fiber. For example, there may be multiple Stokes lasers emitting multiple Stokes laser radiation. For example, each laser may be a single mode laser. For example, at least one pump laser may be a single mode laser. For example, a comb may be utilized. The comb may comprise a spectral range with a difference of between the different wavelengths. The difference may be proportional to a difference of at least about 20 Giga Herz (GHz), 50 GHz, 70 GHz, 100 GHz or 150 Ghz. The difference may be proportional to any of the aforementioned frequencies, e.g., from about 20 GHz to about 150 GHz, or from about 50 GHz to about 100 GHz. For example, at least one of the pump lasers may be a multi-mode laser. The different wavelengths irradiated by the laser may be embedded in a single pump laser such as a Fabry Perot laser. The signal may be transmitted as a modulation. The modulation may comprise self-phase modulation, differential phase shift keying, or analog intensity modulation. The modulation may comprise amplitude modulation, frequency modulation, polarization modulation, phase modulation, spatial modulation, or diffraction modulation. In some embodiments, coherent mixing overlap of the Stokes lasers is optimized. Circular polarization in one or more of the lasers may be used to optimize coherent mixing overlap.

Figure 5:
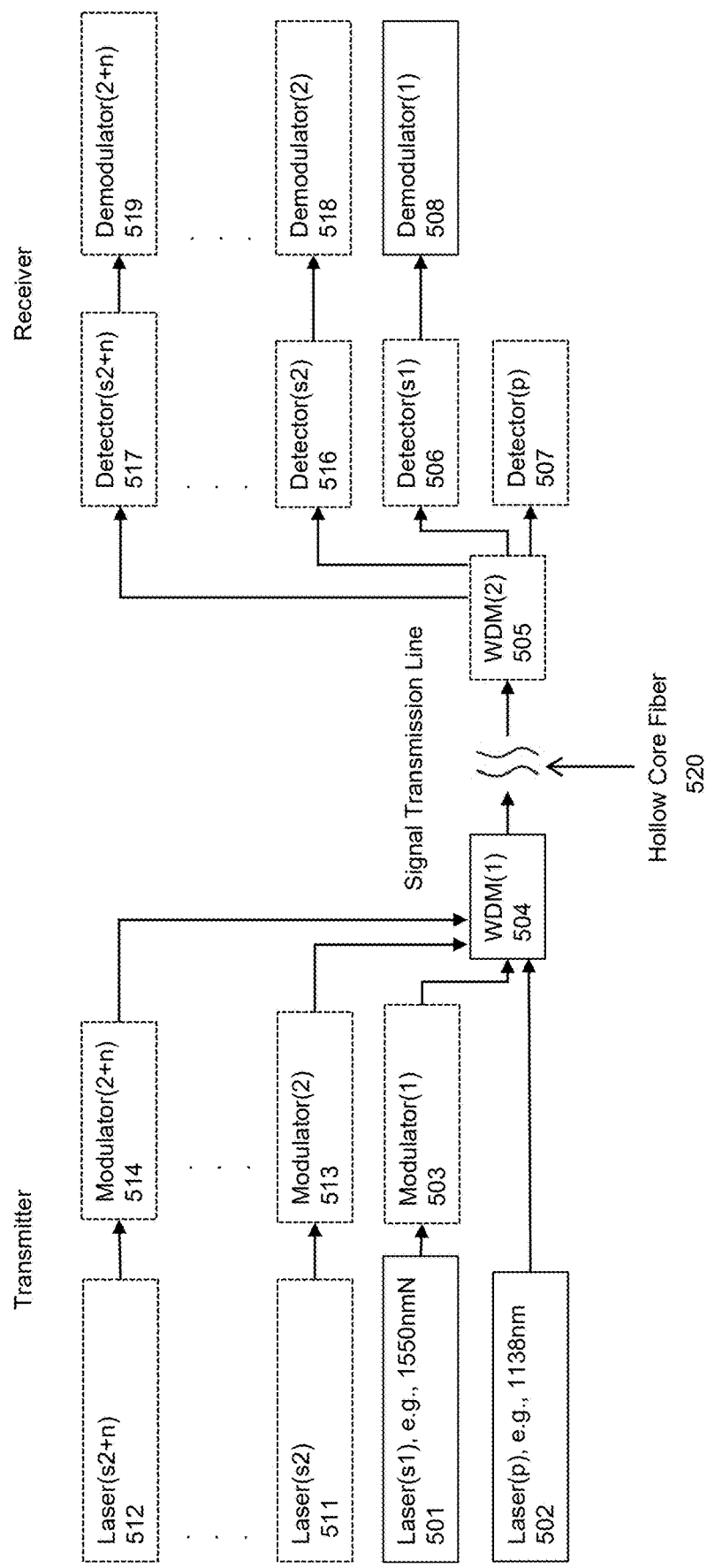
FIG. 5 schematically illustrates portions of a communication system.

FIG. 5 shows an example of a TTE. The TTE in this example includes (a) pump laser 502 that can be a single mode laser such as one irradiating at 1138 nanometers, or any other pump laser disclosed herein as applicable; (b) Stokes laser 501 that can be a single mode laser such as irradiating at 1550 nm, or any other Stokes laser disclosed herein. The Stokes laser is optionally operatively coupled (e.g., connected) with modulator 503. In some embodiments, the modulator is comprised in Stokes laser 501. Pump laser 502 and Stokes laser 501 are operatively coupled with an optical coupler that is an optical coupler such as a wavelength division-multiplexer WDM(1) 504 that is in turn operatively coupled with hollow core fiber 520. In other embodiments, Stokes laser 501 is directly operatively coupled (e.g., connected) to hollow core fiber 520. From WDM(1) 504 a Stokes laser beam carrying the signal and the pump laser beam can propagate into hollow core fiber 520 in which the signal can becomes amplified, e.g., via the HC-SRS method as disclosed herein using co-propagating pump beam. Both the signal beam and the pump beam (if any) can be transmitted through an optical decoupler that is a wavelength-division demultiplexer WDM(2) 505 where they can be separated. In an example, the pump laser at the exit of the hollow fiber is inconsequential, insubstantial, greatly diminished, not disturbing demodulation of the signal, and/or non-detectable. The optical coupler at an entrance end of the hollow fiber, such as WDM(1), can be the same device type or a different device type from the optical decoupler at an exit end of the hollow fiber, such as WDM(2). The exit and entrance opposing ends are designated with respect to the direction of signal propagation. Hollow fiber 520 is operatively coupled with optional detector 506, e.g., through WDM(2) 505. Detector 506 is configured to detect the signal carrying energy beam. Hollow fiber 520 is operatively coupled with optional detector 507, e.g., through WDM(2) 505. Detector 507 is configured to detect any detectable pump laser beam generated by pump laser 502. Demodulator 508 is operatively coupled with the hollow core fiber, e.g., through WDM(2) 505 and optional detector 506.

In some embodiments, the TTE utilizes at least one optical coupler. The optical coupler may comprise a wavelength division multiplexer (WDM). The WDM may comprise coarse WDM or dense WDM. The WDM may multiplex and/or divide, more than 2, 4, 8, 10, 25, 50, or 100 electromagnetic beams. When the TTE utilized WDM, a wavelength division demultiplexer may be utilized, respectively. In some embodiments, the TTE may be devoid of wavelength division multiplexer (WDM), e.g., for multiplexing and/or for dividing the different beams. In some embodiments, the TTE may be devoid of an optical decoupler.

In some embodiments, more than one pump beam type may be used. In some embodiments, a plurality of pump channels may be operatively coupled (e.g., connected) to the optical fiber. The different pump beam types may be embedded in respective pump lasers. For example, each pump laser may generate an emitted pump laser radiation. For example, each laser may be a single mode laser. For example, at least one pump laser may be a single mode laser. For example, at least one of the pump lasers may be a multi-mode laser. The different pump beam types may be generated by a single pump laser such as a Fabry Perot laser. In some embodiments, coherent mixing overlap of the Stokes lasers is optimized. Circular polarization in one or more of the lasers may be used to optimize coherent mixing overlap.

In some embodiments, the method comprises exciting different media member types disposed in an interior of the hollow fiber, e.g., in the hollow space of the fiber. The different member types may comprise a molecule, or an atom (e.g., Noble gas). The media member and media member types can be any of the ones disclosed herein. Each of the different member types may be stimulated by another energy, e.g., require another pump laser beam. Thus, the TTE may comprise different pump lasers to operatively couple with the hollow core fiber, e.g., through an optical coupler such as a WDM. The optical coupler may be passive or active. Each of the different lasers may be selected to generate Raman radiation having the signal carrying beam (Stokes beam) characteristic(s), the Raman radiation being emitted using the HC-SRS methodology, e.g., by each of the different lasers exiting its associated media member type respectively, which each of the associated media member type emitting the Raman radiation upon relaxation. The beam characteristic may comprise wavelength or frequency. Thus, each of the different pump lasers facilitates enhancement of the signal carried by the Stokes laser beam at least in part by the Raman radiation emitted as a consequence of HC-SRS. The excitation of the signal by each of the different pump lasers may or may not be of a different power. The different pump lasers may or may not experience the same loss as they propagate through the hollow fiber. The HC-SRS may comprise Raman radiation copropagating with the signal carrying beam and/or Raman radiation counter-propagating with the signal carrying beam.

Figure 6:
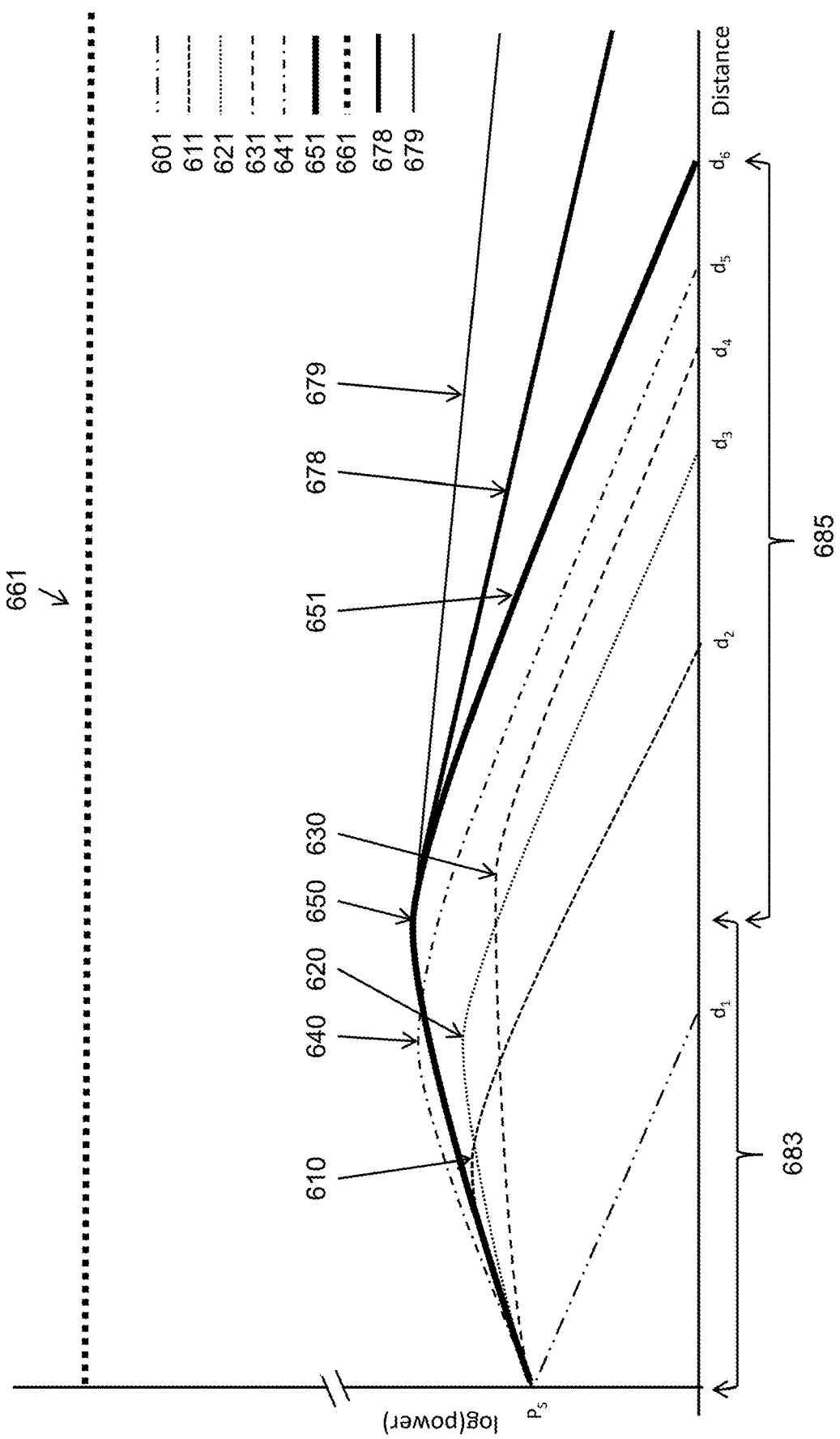
FIG. 6 schematically illustrates a graph depicting laser beam powers as a function of distance.

FIG. 6 shows an example of signal radiation propagating through a hollow fiber devoid of repeaters, depicted as a logarithmic scale of the beam power as a function of distance in the hollow fiber. Numeral 601 corresponds to the Stokes laser beam modulated to carry a signal through the hollow fiber, without the signal being enhanced by HC-SRS, which signal experiences linear loss (e.g., propagation loss), which signal radiation 601 reaches a maximal distance d1 in the hollow fiber without use of repeater(s), which d1 designates a threshold for signal demodulation. Beams carrying signal 611, 621, 631, 641, 651 experience a maximum of signal power at least in part due to use of HC-SRS using Raman radiation co-propagating with the Stokes beam. Numeral 611 designates the beam carrying signal (a) enhanced by a first Raman radiation emitted by a first media member type excited by a first pump laser beam, the enhanced signal radiation 611 having a first maximum power at 610 at least in part due to HC-SRS, and (b) experiences an internal loss as it propagates through the hollow fiber. Beam carrying signal 611 reaches maximal distance d2 in the fiber, which d2 designates the threshold for signal demodulation, with d2 being a greater distance than d1. Numeral 621 designates the beam carrying signal (a) enhanced by a second Raman radiation emitted by a second media member type excited by a second pump laser beam, the beam carrying signal 621 having a second maximum power at 620, and (b) experiences the internal loss as it propagates through the hollow fiber. The second maximum power can be higher than the first maximum power, e.g., 620 is higher than 610. Beam carrying signal 621 reaches distance d3 in the fiber, which d3 designates the threshold for signal demodulation, with d3 being a greater distance than d2. Numeral 641 designates the beam carrying signal (a) enhanced by the first Raman radiation and by the second Raman radiation, the beam carrying signal 641 having a fourth maximum power at 640 at least in part due to HC-SRS, and (b) experiences the internal loss as it propagates through the hollow fiber. Beam carrying signal 641 reaches distance d5 in the fiber, which d5 designates the threshold for signal demodulation, with d5 being a greater distance than d2, and greater than d3. Numeral 631 designates a beam carrying signal (a) enhanced by a third Raman radiation emitted by a third media member type excited by a third pump laser beam, the beam carrying signal 631 having a third maximum power at 630, and (b) experiences the internal loss as it propagates through the hollow fiber. The third maximum power can be lower than the first maximum power, e.g., 630 is lower than 610. Beam carrying signal 631 reaches distance d4 in the fiber, which d4 designates the threshold for signal demodulation, with d4 being a greater distance than d3. The third Raman radiation contributing to a peak at 630 contributes less to the signal enhancement than the second Raman radiation contributing to a peak at 620. Numeral 651 designates the Stokes signal enhanced by the first Raman radiation, by the second Raman radiation, and by the third Raman radiation, the beam carrying signal 651 having a fifth maximum power at 650 at least in part due to HC-SRS. Beam carrying signal 651 reaches distance d6 in the fiber, which d6 designates the threshold of signal detection by the detector, with d6 being a greater distance d5. Numeral 661 designates a power threshold of radiation introduced into the hollow fiber, e.g., without experiencing substantial non-linear effects. In FIG. 6, the enhancement of the signal by HC-SRS stimulated by different pump laser beam beams each exiting a different type of media member disposed in the hollow fiber, shows increase in the distance the signal can propagate in the hollow fiber without being compromised, e.g., such that it can be demodulated. In some cases, the loss of at least two of the pump laser beams is (e.g., substantially) similar as they propagate along the fiber. In the examples of 611, 621, 631, 641, and 651, the graphs show (e.g., substantially) the same loss in the different pump beams as they propagate along the hollow fiber, e.g., for simplicity. However, the losses of at least two of the pump laser beams may be different from each other as they propagate along the fiber. The loss of one or more of the pump beams may enhance the signal at an extended propagation distance and/or to a greater extent, as compared to the example shown in signal carrying beam 651. Examples of the different extent of signal enhancements are shown in FIGS. 2, 201b, 208, and 209. Numeral 678 designates a signal carrying beam experiencing an increase in signal carrying beam power as it propagates along distance 683 having a maximum power at 650, signal carrying beam 678 experiencing a lower loss as it propagates along distance 685 as compared to beam 651. Numeral 679 designates a signal experiencing an increase in signal carrying beam power as it propagates along distance 683, the signal carrying beam having a maximal power at 650, signal carrying beam 679 experiencing a lower loss as it propagates at distance 685, the lower loss being compared with signal carrying beam 651 and with signal carrying beam portion 678. The hollow fiber comprises portion 683 and portion 685.

In some examples, additional Stokes lasers can be operatively coupled with the hollow core fibers. The additional stokes lasers can be part of a frequency comb, or not. The additional stokes lasers are associated with different pump radiation beam characteristics comprising wavelength or frequency. The different pump radiations beam characteristics may correspond to the same type of media member type emitting the Raman radiation, or to different media types, each emitting its Raman radiation. FIG. 5 shows an example of other optional Stokes lasers that can be operatively coupled with hollow core fiber 520, the additional optional Stokes lasers being Stokes Laser(s2) 511 to laser(2+n) 512, with n being an integer. At least one of the Stokes lasers 511 to 512 can be operatively coupled with its optional modulator. At least one of the Stokes Laser(n) 511 to laser(n+1) 512 may comprise its modulator. In the example shown in FIG. 5, modulators 513 to 514 are each optional modulators to optional Stokes lasers 511 to 512, respectively. Optional laser 511 is operatively coupled with optional modulator 513, and optional laser 512 is operatively coupled with optional modulator 514. Stokes lasers 511 to 512 are operatively coupled with an optical coupler such as WDM(1) 504, e.g., through optional modulators 513 to 514. When the additional Stokes beams 511 to 512 are utilized, additional optional detectors 516 to 517 can be operatively coupled with the hollow core fiber, e.g., through an optical decoupler such as WDM(2) 505, which detectors 516 to 517 being configured to respectively detect beam characteristic(s) of beams generated respectively by Stokes lasers 511 to 512;

and demodulators 518 to 519 are operatively coupled with hollow core fiber 520, with each of demodulators 518 to 519 being configured to demodulate the signal carried by their respective Stokes laser beams. The beam characteristic(s) may comprise frequency or wavelength. The beam characteristic(s) may comprise distinctive beam characteristics. While FIG. 5 shows an example of TTE comprising a single pump laser, additional pump lasers may be utilized, e.g., optionally with additional respective pump detectors. In an example, instead of using a multi-mode pump laser such as corresponding to a frequency comb, a plurality of (e.g., single mode) pump laser is used. The plurality of single mode lasers may together correspond to a frequency comb. In other embodiments, the plurality of single mode lasers corresponds to the Stokes lasers, which do not form a frequency comb, e.g., as in the case of exciting different media members in the hollow fiber which do not form a frequency comb, e.g., as in the case of different pump lasers exciting different media members in the hollow fiber.

Figure 7:
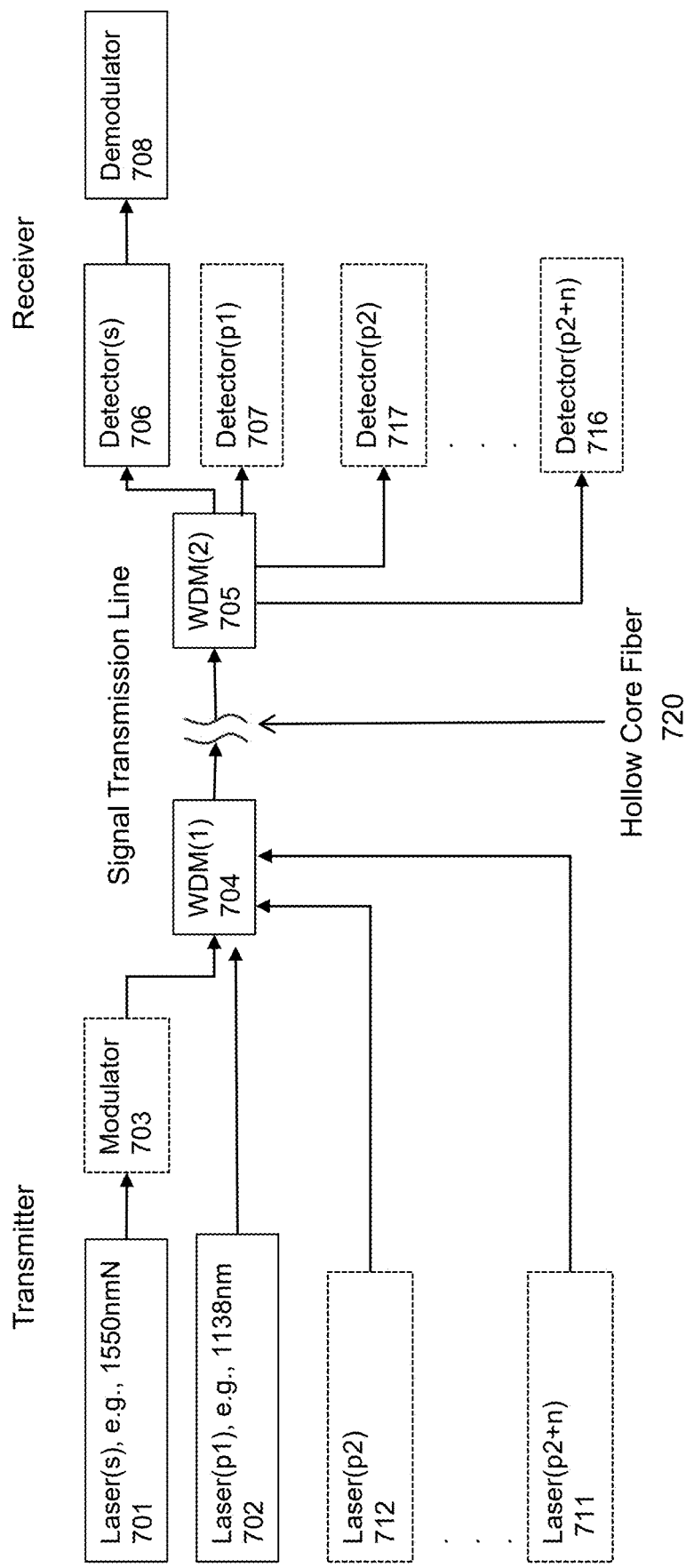
FIG. 7 schematically illustrates portions of a communication system.

FIG. 7 shows an example of a TTE. The TTE in this example includes (a) pump laser 702 that can be a single mode such as laser irradiating at 1138 nanometers, or any other pump laser disclosed herein as applicable; (b) Stokes laser 701 that can be a single mode laser such as irradiating at 1550 nm, or any other Stokes laser disclosed herein. The Stokes laser is optionally operatively coupled (e.g., connected) with modulator 703. In some embodiments, the modulator is comprised in Stokes laser 701. Pump laser 702 and Stokes laser 701 are operatively coupled with an optical coupler that is a wavelength division-multiplexer WDM(1) 704 that is in turn operatively coupled with hollow core fiber 720. In other embodiments, Stokes laser 701 is directly operatively coupled (e.g., connected) to hollow core fiber 720. From WDM(1) 704 a Stokes laser beam carrying the signal and the pump laser beam can propagate into hollow core fiber 720 in which the signal can becomes amplified, e.g., via the HC-SRS method as disclosed herein utilizing Raman radiation co-propagating with the signal carrying beam (Stokes beam). Both the signal beam and the pump beam (if any) can be transmitted through an optical decoupler such as a wavelength-division demultiplexer WDM(2) 705 where they can be separated. Hollow fiber 720 is operatively coupled with optional detector 706, e.g., through WDM(2) 705. Detector 706 is configured to detect the signal carrying energy beam. Hollow fiber 720 is operatively coupled with optional detector 707, e.g., through WDM(2) 705. Detector 707 is configured to detect any detectable pump laser beam generated by pump laser 702. Demodulator 708 is operatively coupled with the hollow core fiber, e.g., through WDM(2) 705 and detector 706. FIG. 7 shows an example of other optional pump lasers that can be operatively coupled with hollow core fiber 720 for utilization of a co-propagating HC-SRS methodology, the additional optional pump lasers being pump Laser(s2) 711 to laser(2+n) 712, with n being an integer. Pump lasers 711 to 712 are operatively coupled with WDM(1) 704. When the additional pump beams 711 to 712 are utilized, additional optional detectors 716 to 717 can be operatively coupled with the hollow core fiber, e.g., through WDM(2) 705, which detectors 716 to 717 being configured to respectively detect beam characteristic(s) of beams generated respectively by pump lasers 711 to 712. The beam characteristic(s) may comprise frequency or wavelength. The beam characteristic(s) may comprise distinctive beam characteristics. At least one of the pump lasers may be a single mode laser. At least one of the pump lasers may be a multi-mode laser, e.g., emitting a frequency comb. The plurality of single mode pump lasers may correspond together to a frequency comb. In other embodiments, the plurality of single mode pump lasers corresponds do not form a frequency comb, e.g., as in the case of exciting different media members in the hollow fiber by different pump lasers, each different pump laser exiting each of the different media members, respectively. While FIG. 7 shows an example of TTE comprising a single Stokes laser, additional Stokes lasers may be utilized, e.g., optionally with additional respective Stokes detectors and optional demodulator(s). In an example, instead of using a multi-mode Stokes laser such as corresponding to a frequency comb, a plurality of (e.g., single mode) Stokes lasers are used. The plurality of single mode Stokes lasers may together correspond to a frequency comb. In other embodiments, the plurality of single mode Stokes lasers corresponds to the pump lasers, which do not form a frequency comb, e.g., as in the case of different pump lasers exciting different media members in the hollow fiber.

In some embodiments, the system, device, and/or apparatus disclosed herein comprises a control system such as a control system controlling the laser(s) and any peripheral components, e.g., redundant component(s), and/or protective component(s). The control system may comprise one or more controllers, e.g., that form a control system. The control system may comprise, or be operatively coupled with, one or more devices, apparatuses, and/or systems of the mechanism (e.g., system, device, or apparatus) disclosed herein, including any component of the device(s), apparatuses(s), and/or system(s). The controller(s) may comprise, or be operatively coupled with, a hierarchical control system. The hierarchical control system may comprise at least three, four, or five, control levels. In some embodiments, at least two operations are performed, or directed, by the same controller. In some embodiments, at least two operations are each performed, or directed, by a different controller. A control system may comprise a control system. A control system may comprise a laser control system. The controller may comprise a feedback control scheme. The feedback control scheme may comprise an open feedback loop control scheme. The feedback loop control scheme may comprise a closed feedback loop control scheme. Feedback control scheme may comprise hardware compensation. Feedback control scheme may comprise software compensation. The control system may comprise, or be operatively coupled with, a metrological detection system and configured to receive measurement data from the metrological detection system. The control system may be configured to generate control signals responsive to the measurement data collected by the metrological detection system. In an example, the metrological detector detects a Stokes beam signal transmitted by the optical fiber. In an example, the metrological detector detects a pump beam signal transmitted by the optical fiber. In an example, the metrological detector detects Raman scattering transmitted by the optical fiber.

In some embodiments, the Raman radiation in the SRS is co-propagating with the signal carrying beam, also referred to herein as the Stokes beam. In some embodiments, the Raman radiation in the SRS is counter-propagating relative to the signal carrying beam. In some embodiments, the Raman radiation in the SRS is co-propagating and counter-propagating relative to the signal carrying beam. The amount of amplification of the signal carrying beam by the co-propagating Raman radiation may or may not be (e.g., substantially) the same as the counter-propagating Raman radiation. In an example, the amount of amplification of the signal carrying beam by the co-propagating Raman radiation is higher than the amount of amplification gained by the counter-propagating Raman radiation. The co-propagating Raman radiation may be generated by a pump laser operatively coupled with an entrance end of the optical fiber. Such pump laser may be referred to as a "front pump laser." The counter-propagating Raman radiation may be generated by a pump laser operatively coupled with an exit end of the optical fiber. Such pump laser may be referred to as a "rear pump laser." The front pump laser and the rear pump laser may differ by at least one laser characteristic. The front pump laser and the rear pump laser may be (e.g., substantially) the same in at least one laser characteristic. The at least one laser characteristic may comprise phase, power, amplitude, polarization, or wavelength. The wavelength may be substituted by frequency. The front pump laser and the rear pump laser may be of (e.g., substantially) the same type or of a different type, e.g., emit the same type of laser radiation having (e.g., substantially) the same wavelength. In an example, the front pump laser and the rear pump lasers, each excite the same type of media member disposed in the HC-fiber, e.g., the same type of gas molecule. In an example, the front pump laser and the rear pump laser, each excite a different type of media member disposed in the HC-fiber, e.g., a different type of gas molecule. The front pump laser and the rear pump laser may be of (e.g., substantially) the same power or of a different power. The HC-SRS methodology may comprise co-propagating Raman radiation or counter-propagating Raman radiation. In an example, HC-SRS methodology includes co-propagating Raman radiation and counter-propagating Raman radiation. The power of the front pump laser and/or of the rear pump laser may be adjusted, e.g., in real time during operation. The adjustment may be dynamic. The adjusted may be controlled. The control may be automatic using the control system disclosed herein. The control may comprise any control schemes disclosed herein, e.g., feedback control. The control system may adjust the power of the pump laser(s) based at least in part on data from at least one detector, e.g., disclosed herein. The detector(s) may detect at least one characteristic of (a) the front pump laser, (b) the front pump laser beam exiting the HC-fiber (e.g., using detector 907), (c) the rear pump laser, (d) the front rear laser beam exiting the HC-fiber (e.g., using detector 912), (e) Stokes beam detector (e.g., using detector 906), (f) beam profile of the signal beam as a function of propagation distance in the transmission line (e.g., in the HC-fiber), or (g) any combination thereof. The transmission line may comprise additional sensors and/or detectors to facilitate detection of the signal beam, of the co-propagating Raman radiation, of the counter-propagating Raman radiation, of the front pump laser beam, of the rear pump laser beam, or any combination thereof. Any of the beams may be detected along the signal transmission line, e.g., using appropriate sensor(s) and/or detector(s). The sensor(s) and/or detector(s) may be operatively coupled with the control system, e.g., as disclosed herein. The control system may be a hierarchical control system comprising at least two, three, or four levels of hierarchy. The control system may utilize a control scheme comprising a feedback control scheme or a feed forward control scheme. The control system may utilize a control scheme comprising a closed loop control scheme or an open loop control scheme. The feed forward and/or open loop control scheme(s) may utilize a simulation such as a physics-based simulation. The physics-based simulations may consider one or more properties of the HC-fiber. The one or more properties the type of the HC-fiber, e.g., as disclosed herein. The one or more properties may comprise the chemical and/or physical nature of the HC-fiber, e.g., of the core, of the jacket, and/or of any cladding. The one or more properties may comprise material properties of the HC-fiber, e.g., the nature of the media members in the HC fiber. The one or more properties may comprise at least one FLS of the hollow core fiber. In some embodiments, the power profiles disclosed herein pertaining to the co-propagating Raman radiation with the signal carrying beam causing Raman amplification of the signal via the HC-SRS methodology (e.g., depicted in FIG. 2, 270, and in example FIG. 6) are similar to a counter-propagating Raman radiation.

In some embodiments, the HC-SRS methodology allows for a lower power profile variability of the transmitted laser bean in the communication fiber, as compared to signal communication not using the HC-SRS methodology. In some embodiments, the HC-SRS methodology allows for the power profile of the laser beam to be more stable during its propagation in the communication fiber, as compared to signal communication not using the HC-SRS methodology. The power profile may be of the signal carrying beam. The power variability during optical signal transmission may be smaller by at least about 10%, 25%, 50%, or 75%, when using the HC-SRS as compared with another optical signal transmission methodology. The other optical signal transmission methodology may utilize an optical fiber comprising at least one hollow core optical fiber section or at least one solid core optical fiber section. The other optical signal transmission methodology may utilize an optical fiber comprising a hollow core optical fiber or a solid core optical fiber. In an example, the other optical signal transmission methodology utilizes a solid core optical fiber.

FIG. 8 shows examples of power dependence of the signal carrying beam on the distance along transmission lines. The power may be a power profile in the communication channel, e.g., comprising the interconnected media. In the example shown in 818, the communication channel comprises an optical fiber having several sections (e.g., being a complex optical fiber), the optical fiber being operatively coupled with separate optical amplifiers that are separate to the optical fiber. Each of the amplifiers in the example shown in 818 is a standalone (e.g., discrete) amplifier. In the example shown in 818, the optical amplifiers are each a local amplifier, e.g., with respect to the fiber utilized for communication of the signal. In the example shown in 818, the optical fiber may be a solid core fiber or a hollow core fiber. The separate amplifiers may comprise doped fiber amplifiers, semiconductor amplifiers, or Raman amplifiers. In an example, the amplifiers are Erbium Doped Fiber Amplifiers (EDFAs). The signal carrying laser beam having power 810$a$ enters the communication channel and is amplified by a first separate amplifier (e.g., first EDFA amplifier such as a power booster) to amplify power of the signal carrying beam to power level 811. The signal carrying beam then propagates through a first section of the optical fiber where the signal carrying beam experiences loss 812 until reaching a second separate amplifier (e.g., second EDFA amplifier such as a remote optically pumped amplifier (ROPA)) that causes the power of the signal carrying beam to increase to power level 813, which signal carrying beam then continues is propagation through a second section of the optical fiber during which it experiences loss 814. The signal carrying beam then enters a third separate amplifier (e.g., an EDFA pre-amplifier) causing it to increase its power to level 815 and exits the transmission line as 810$b$. The series of separate amplifiers thus may (e.g., substantially) maintain the power level of the signal carrying beam as it traverses along the transmission line, albeit inherent power loss experienced by the signal carrying beam. Power level 816 depicts a limit of the non-linear attenuation of the signal carrying beam during its propagation along the transmission line, and power level 817 depicts the noise limit below which the signal carried by the signal carrying beam is not decipherable and/or detectable. In the example shown in 818, the fiber utilized for signal communication (e.g., the interconnected media, which in this case can comprise a solid core fiber or a hollow core fiber) is separated into four sections, that are collectively connected to three amplifiers, which connections increase loss of the signal, e.g., via external loss.

In the example shown in 828 of FIG. 8, the communication channel comprises a hollow core optical fiber using the HC-SRS methodology disclosed herein devoid of separate amplifiers. The hollow core optical fiber may comprise a single section or several sections. The several sections of the hollow core fiber may or may not be of the same type. In an example, the hollow core fiber is a single section. In example 828, the signal carrying beam enters the transmission line having power level 820*a*. As the signal carrying beam experiences amplification due to Raman radiation (HC-SRS) that is co-propagating 831 with the signal carrying beam (Stokes laser beam). The co-propagating Raman radiation can be induced by a first pump operatively coupled with a first end of the HC-fiber to which the Stokes laser is operatively coupled with, e.g., in a configuration similar to the one depicted in FIG. 5. As the amplified signal propagates along the HC fiber, the signal experiences loss that causes reduction of the power to level 822. A second pump laser may be operatively coupled with a second end of the HC-fiber opposing to the first end. Such a pump may cause Raman radiation in direction 832 that is counter-propagating to the direction of the signal. The counter propagating Raman radiation may cause amplification of the signal carrying beam to power level 823, followed by loss 824 until it emerges out of the transmission line as having power level 820*b*. While the level of amplification depicted in the example 828 is (e.g., substantially) the same for the counter-propagating and for the co-propagating Raman radiation relative to the propagation direction of the signal, in other embodiments such level of amplification may differ. The level of amplification by the co-propagating Raman radiation relative to that of the counter-propagating Raman radiation, may be selected. The selection may be adjusted. The adjustment may be dynamic, e.g., during propagation of the signal carrying beam. The adjustment may be such that the power level of the incoming beam 820*a* may experience minimal loss during propagation along the transmission line (e.g., HC-fiber) and emergence as the outgoing beam 820*b* from the transmission line. The adjustment may be such that the power level of the incoming beam 820*a* may be (e.g., substantially) similar to the power level of the outgoing beam 820*b* from the transmission line. The distance 831 along the signal transmission line in which the signal carrying beam experiences amplification by the co-propagating Raman radiation may or may not be (e.g., substantially) the same as the distance 832 along the signal transmission line in which the signal carrying beam experiences amplification by the counter-propagating Raman radiation. While in the example shown in 828, distances 831 and 832 are (e.g., substantially) the same, in other embodiments they may differ. In an example, a distance along the signal transmission line in which the signal carrying beam experiences amplification by the co-propagating Raman radiation is greater than the distance along the signal transmission line in which the signal carrying beam experiences amplification by the counter-propagating Raman radiation. In an example, a distance along the signal transmission line in which the signal carrying beam experiences amplification by the co-propagating Raman radiation overlaps at least in part the distance along the signal transmission line in which the signal carrying beam experiences amplification by the counter-propagating Raman radiation. Such overlap may cause reduction of the energy dip shown in 833. Power level 826 depicts a limit of the non-linear attenuation of the signal carrying beam during its propagation along the transmission line, and power level 827 depicts the noise limit below which the signal carried by the signal carrying beam (Stokes beam) is not decipherable and/or detectable. In the example shown in 828, the fiber utilized for signal communication (e.g., the interconnected media, which in this case is a hollow core fiber) can be a single section. The interconnected media in the example of 828 is not connected to external amplifiers, and thus does not experience the external loss.

Figure 9:
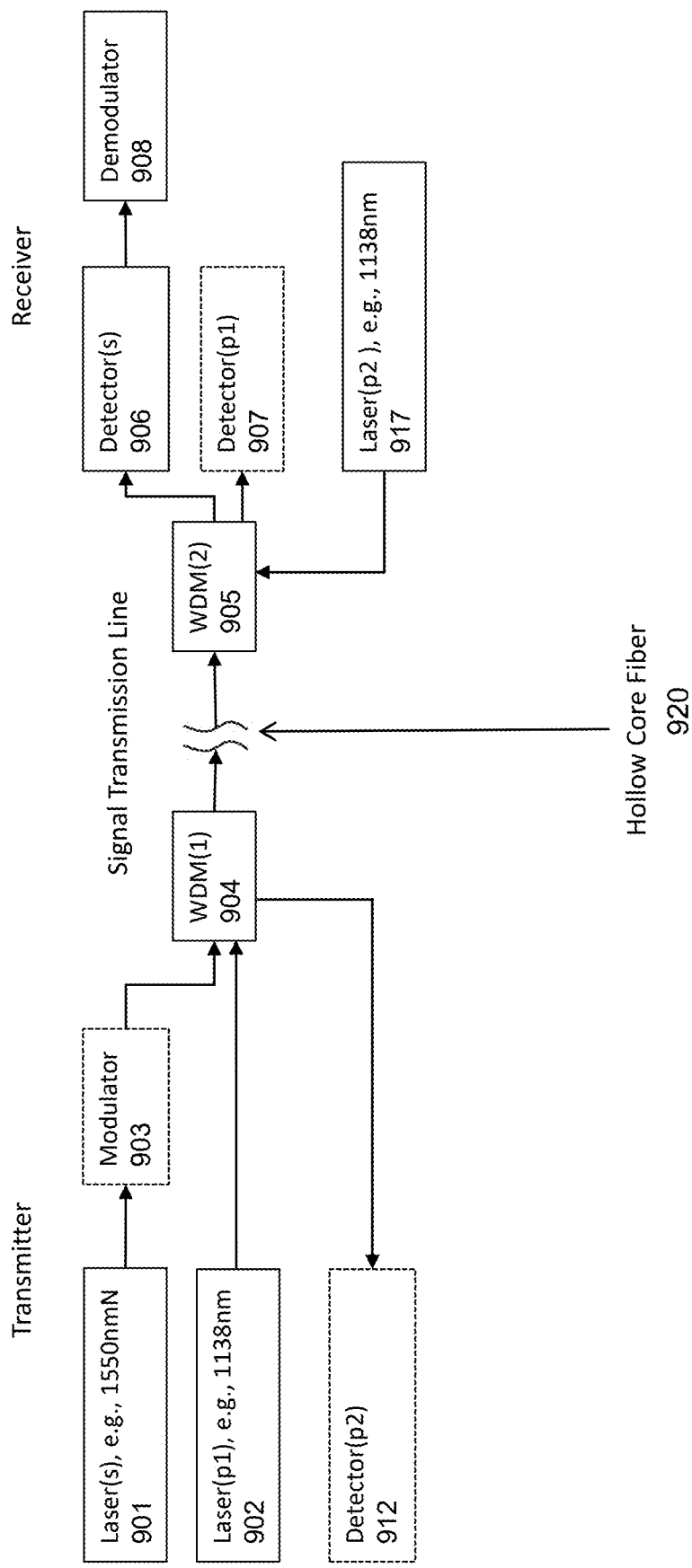
FIG. 9 schematically illustrates portions of a communication system.

FIG. 9 shows an example of a TTE. The TTE in this example includes (a) a first pump laser 902 that can be a single mode such as laser irradiating at 1138 nanometers, or any other pump laser disclosed herein, as applicable; (b) Stokes laser 901 that can be a single mode laser such as irradiating at 1550 nm, or any other Stokes laser disclosed herein, and (c) a second pump laser 917 that can be a single mode such as laser irradiating at 1138 nanometers, or any other pump laser disclosed herein, as applicable. Pump laser 902 is a front pump laser, and pump laser 917 is a rear pump laser. The first (front) pump laser may or may not be of the same type as the second (rear) pump laser. In an example, the front pump laser may be of the same type as the rear pump laser. The Stokes laser is optionally operatively coupled (e.g., connected) with modulator 903. In some embodiments, the modulator is comprised in Stokes laser 901. Front pump laser 902 and Stokes laser 901 are operatively coupled with an optical coupler such as a wavelength division-multiplexer WDM(1) 904 that is in turn operatively coupled with a first (front) side of a hollow core fiber 920. In other embodiments, Stokes laser 901 is directly operatively coupled (e.g., connected) to hollow core fiber 920. From WDM(1) 904 a Stokes laser beam carrying the signal and the front pump laser beam generated by front pump laser 902, can co-propagate into hollow core fiber 920 in which the signal can becomes amplified, e.g., via the co-propagating HC-SRS method as disclosed herein. Both the signal beam and the front pump beam (if any) can be transmitted through an optical decoupler such as a wavelength-division demultiplexer WDM(2) 905 where they can be separated. Hollow fiber 920 is operatively coupled with optional detector 906, e.g., through WDM(2) 905. Detector 906 is configured to detect the signal carrying energy beam. Hollow fiber 920 is operatively coupled with optional detector 907, e.g., through WDM(2) 905. Detector 907 is configured to detect any detectable beam generated by front pump laser 902. Demodulator 908 is operatively coupled with the hollow core fiber, e.g., through WDM(2) 905 and detector 906. FIG. 9 shows an example of another optional pump laser 917, which is the second pump laser—the rear pump laser, which is operatively coupled with hollow core fiber 920 at a second end opposing the first end, to induce a counter-propagating HC-SRS methodology, the second end being the rear end. The second pump laser 917 is operatively coupled with an optical coupler such as WDM(2) 905, e.g., acting as a coupler and as a decoupler. Optional detector 912 may be utilized to detect any detectable rear pump laser beam generated by pump laser 917. Detector 907 may be configured to detect beam characteristic(s) of laser beam generated by front pump lasers 902. Detector 912 may be configured to detect beam characteristic(s) of the laser beam generated by rear pump laser 917. The beam characteristic(s) may comprise frequency or wavelength. The beam characteristic(s) may comprise distinctive beam characteristics. At least one of the pump lasers 902 and 917 may be a single mode laser. At least one of the pump lasers 902 and 917 may be a multi-mode laser, e.g., emitting a frequency comb. While FIG. 9 shows an example of TTE comprising a single Stokes laser. However, additional Stokes lasers may be utilized in other embodiments, e.g., optionally with additional respective Stokes detectors and optional demodulator(s). The additional Stokes lasers may be any of the Stokes lasers disclosed herein. While FIG. 9 shows an example of TTE comprising a single front pump laser 902 utilized for co-propagating HC-SRS (front pump laser), additional front pump lasers may be utilized. While FIG. 9 shows an example of TTE comprising a single rear pump laser 917 utilized for counter-propagating HC-SRS (rear pump laser), additional rear pump lasers may be utilized. At least one of the front pump lasers utilized for co-propagating HC-SRS may be of the same type as at least one of the rear pump lasers utilized for counter-propagating HC-SRS. At least one of the front pump lasers utilized for co-propagating HC-SRS may be different from at least one of the rear pump lasers utilized for counter-propagating HC-SRS. The additional pump lasers (front and/or rear) may be any of the pump lasers disclosed herein.

In some embodiments, the hollow core communication fiber utilizing the HC-SRS amplification, is operatively coupled with one or more external amplifiers, e.g., providing localized amplification. In some embodiments, the HC-SRS provides distributed amplification of the signal along the HC fiber utilized for signal communication. With respect to the HC communication fiber utilized for the HC-SRS in the distributed amplification during propagation of the signal therethrough, the amplifier(s) operatively coupled with the HC communication fiber provide localized amplification, e.g., at their connection with the HC communication fiber. In some embodiments, the amplifier providing the localized amplification is a standalone, or discrete, amplifier.

In some embodiments, the optical fiber may be encased in a casing. The casing may shield the fiber from one or more conditions prevailing in the ambient environment external to the fiber. The one or more conditions may comprise pressure, temperature, corrosion, physical force. The physical force may be such that in absence of the casing may cause the fiber to be damaged, e.g., such that its use may be (e.g., substantially) compromised.

In some embodiments, the systems, apparatuses, devices, and/or components thereof disclosed herein comprise one or more controllers. The one or more controllers can comprise at least one central processing unit (CPU), input/output (I/O) and/or communications module. The CPU can comprise electronic circuitry that carries out instructions of a computer program by performing basic arithmetic, logical, control and I/O operations specified by the instructions. The controller can comprise suitable software (e.g., operating system). The control system may optionally include a feedback control loop and/or feed-forward control loop. The controllers may be shared between one or more systems or apparatuses. Each apparatus or system may have its own controller. Two or more systems and/or its components may share a controller. Two or more apparatuses and/or its components may share a controller. The controller may monitor and/or direct (e.g., physical) alteration of the operating conditions of the apparatuses, software, and/or methods described herein. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from a sensor). The controller may deliver an output. The controller may comprise multiple controllers. The controller may receive multiple inputs. The controller may generate multiple outputs. The controller may be a single input single output controller (SISO) or a multiple input multiple output controller (MIMO). The controller may interpret the input signal received. The controller may acquire data from one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise a keyboard, keypad, mouse, touch screen, microphone, speech recognition package, camera, imaging system, or any combination thereof. The outputs may include a display (e.g., screen), speaker, or printer.

Figure 10:
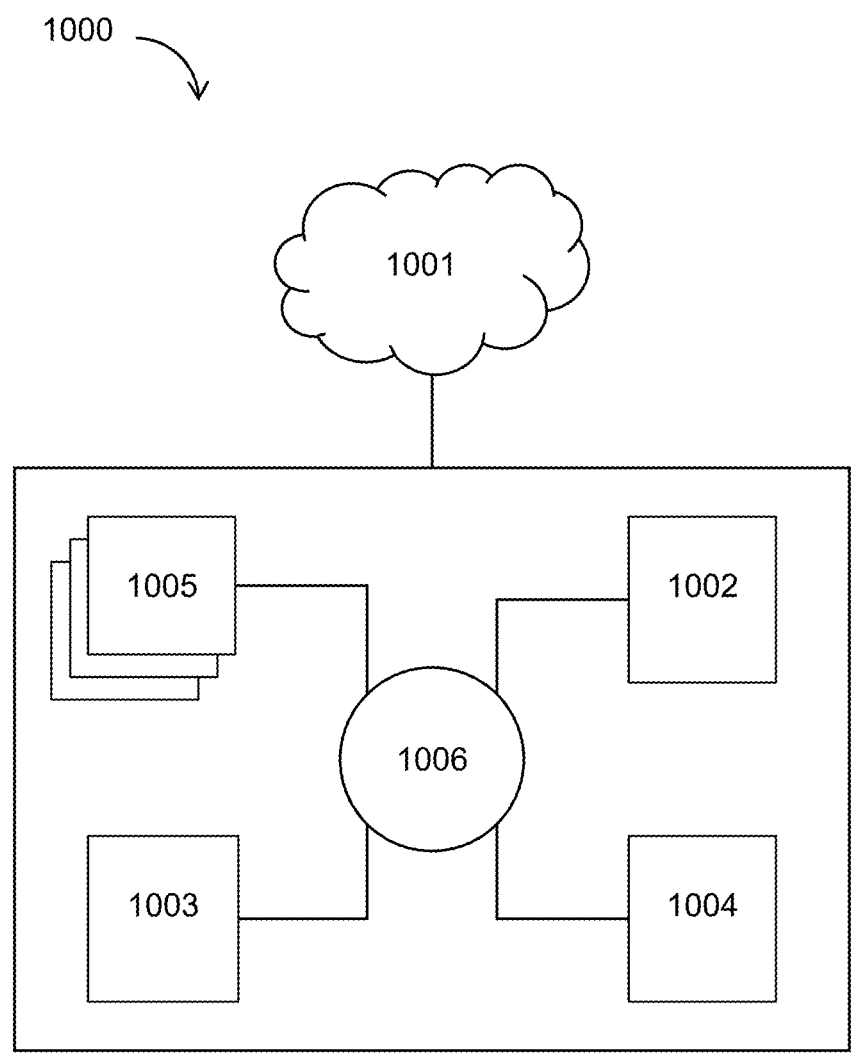
FIG. 10 schematically illustrates a computer control system that is programmed or otherwise configured to facilitate the methods disclosed herein.

In some embodiments, the device, system, and/or apparatus disclosed herein comprises a processor. The processor may be a processing unit. The controller may comprise a processing unit. The processing unit may be central. The processing unit may comprise a central processing unit (herein "CPU"). The controllers or control mechanisms (e.g., comprising a computer system) may be programmed to implement any of the methods disclosed herein. The processor may be programmed to implement any of the methods disclosed herein. The controller may control at least one component of the systems and/or apparatuses disclosed herein. FIG. 10 is a schematic example of a computer system 1000 that is programmed or otherwise configured to facilitate execution of any of the methods provided herein. The computer system 1000 can control (e.g., direct, monitor, and/or regulate) various features of the methods, apparatuses, devices, and/or systems of the present disclosure. The computer system 1000 can be part of (e.g., a portion of), or be in communication with, the device, system and/or apparatus disclosed herein. The computer may be coupled with one or more mechanisms disclosed herein, and/or any parts thereof. The computer system 1000 can include a processing unit 1006 (also "processor," "computer" and "computer processor" used herein). The computer system may include memory or memory location 1002 (e.g., random-access memory, read-only memory, flash memory), electronic storage unit 1004 (e.g., hard disk), communication interface 1003 (e.g., network adapter) for communicating with one or more other systems, and peripheral devices 1005, such as cache, other memory, data storage and/or electronic display adapters. The memory 1002, storage unit 1004, interface 1003, and peripheral devices 1005 are in communication with the processing unit 1006 through a communication bus (solid lines), such as a motherboard. The storage unit can be a data storage unit (or data repository) for storing data. The computer system can be operatively coupled with a computer network ("network") 1001, e.g., with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled with the computer system to behave as a client or a server. The processing unit can execute a sequence of machine-readable instructions, which can be embodied in a program or software. The instructions may be stored in a memory location, e.g., memory 1002. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system (e.g., 1000) can be included in the circuit.

In some embodiments, the storage unit (e.g., 1004) stores files, such as drivers, libraries, and saved programs. The storage unit can store user data (e.g., user preferences and user programs). In some cases, the computer system can include one or more additional data storage units that are external to the computer system, such as located on a remote server that is in communication with the computer system through an intranet or the Internet. The processor may be configured to process control protocols, e.g., communicate with one or more components of the mechanism (e.g., device, apparatus, and/or system) disclosed herein using the control protocols. Control protocols can be one or more of the internet protocol suites, e.g., transmission control protocol (TCP) or transmission control protocol/internet protocol (TCP/IP). Control protocols can be one or more serial communication protocols. Control protocols can be one or more of controller area networks or another message-based protocol, e.g., for communication with microcontrollers and devices. Control protocols can interface with one or more serial bus interfaces for communication with the mechanism disclosed herein, e.g., with any of its components. The control protocol can be any control protocol disclosed herein.

In some embodiments, the system, device, and/or apparatus disclosed herein comprises communicating through a network. The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

In some embodiments, the computer system utilizes program instructions to execute, or direct execution of, operation(s). The program instructions can be inscribed in a machine executable code. Methods as described herein can be implemented by way of machine (e.g., computer processor) executable code stored on an electronic storage location of the computer system, such as on memory 1002 or electronic storage unit 1004. The machine executable or machine-readable code can be provided in the form of software. During use, the processor (e.g., 1006) can execute the code. In some cases, the code can be retrieved from the storage unit and stored on the memory for ready access by the processor. In some situations, the electronic storage unit can be precluded, and machine-executable instructions are stored on memory. The code can be pre-compiled and configured for use with a machine having a processer adapted to execute the code or can be compiled during runtime. The code can be supplied in a programming language that can be selected to enable the code to execute in a pre-compiled or as-compiled fashion.

Control may comprise regulate, modulate, adjust, maintain, alter, change, govern, manage, restrain, restrict, direct, guide, oversee, manage, preserve, sustain, restrain, temper, or vary.

In some embodiments, the computer system utilizes a machine readable medium/media to execute, or direct execution of, operation(s). The program instructions can be inscribed in a machine executable code. A machine-readable medium/media, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as the main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

In some embodiments, the device, system, and/or apparatus disclosed herein comprises, or is operatively coupled with, a communication technology, e.g., in addition to the optical fiber disclosed herein. The communication may comprise wired or wireless communication. For example, the systems, apparatuses, and/or parts thereof may comprise Bluetooth, wi-fi, global positioning system (GPS), or radiofrequency (RF) technology. The RF technology may comprise ultrawideband (UWB) technology. Systems, apparatuses, and/or parts thereof may comprise a communication port. The communication port may be a serial port or a parallel port. The communication port may be a Universal Serial Bus port (i.e., USB). The systems, apparatuses, and/or parts thereof may comprise USB ports. The USB can be micro or mini-USB. The surface identification mechanism may comprise a plug and/or a socket, e.g., electrical, AC power, DC power. The systems, apparatuses, and/or parts thereof may comprise an electrical adapter (e.g., AC and/or DC power adapter). The systems, apparatuses, and/or parts thereof may comprise a power connector. The power connector can be an electrical power connector. The power connector may comprise a magnetically attached power connector. The power connector can be a dock connector. The connector can be a data and power connector. The connector may comprise pins. The connector may comprise at least about 10, 15, 18, 20, 22, 24, 26, 28, 30, 40, 42, 45, 50, 55, 80, or 100 pins.

While preferred embodiments of the present inventions have been shown, and described herein, it will be obvious to those skilled in the art that such embodiments are provided by way of example only. It is not intended that the present disclosure be limited by the specific examples provided within the specification. While the present disclosure has been described with reference to the afore-mentioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations, or relative proportions set forth herein which depend upon a variety of conditions and variables. It should be understood that various alternatives to the embodiments described herein might be employed in practicing the present disclosure. It is therefore contemplated that the present disclosure shall also cover any such alternatives, modifications, variations, or equivalents. It is intended that the following claims define the scope of the present disclosure and that methods and structures within the scope of these claims and their equivalents be covered thereby.

What is claimed is:

1. A method for optical signal communication, the method comprising:
   (a) providing a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for the optical signal communication comprising transmission of a signal through the hollow fiber from the first end to the second end forming a signal transmission path, the signal transmission path substantially spanning a distance of the optical signal communication comprising long haul communication or short haul communication, the signal comprising electromagnetic radiation;
   (b) transmitting a first laser beam into the hollow fiber to excite at least one member of the media members such that the at least one member excited by the first laser beam emits Raman radiation upon relaxation, the Raman radiation having a wavelength; and
   (c) modulating a second laser beam to carry the signal utilized for the optical signal communication and transmitting the second laser beam carrying the signal through the hollow fiber along the signal transmission path, a gain of the second laser beam carrying the signal being increased by the Raman radiation having the wavelength, the gain of the second laser beam being increased along the signal transmission path during propagation of the second laser beam through the hollow fiber.

2. The method of claim 1, wherein (A) the signal transmission path is disposed between geographically distant locations comprising different facilities, different streets, different cities, different counties, different states, different islands, or different continents (B) the distance of the optical signal communication comprises long haul communication, or (C) any combination of (A) and (B).

3. The method of claim 1, further comprising communicating the signal by a communication system comprising the hollow fiber, the communication system being devoid of an enhancer configured to (i) amplify the signal and (ii) operatively couple to the hollow fiber, the enhancer being discrete.

4. The method of claim 1, further comprising communicating the signal by a communication system comprising the hollow fiber, the communication system being devoid of an enhancer configured to operatively couple to the hollow fiber, the enhancer being configured to amplify the signal locally with respect to the signal transmission path.

5. The method of claim 1, wherein the Raman radiation is a first Raman radiation; wherein the second laser beam devoid of enhancement by Raman radiation experiences a first degree of loss as it propagates in the hollow fiber; and wherein the method comprises using the first Raman radiation to enhance the signal at least in part by generating a second degree of loss of the signal that is lower than the first degree of loss, the second degree of loss being lower at least in part by (a) generating a maximum increase in a power of the signal higher than the first degree of loss, the maximum increase being at a signal propagation distance in the hollow fiber from the first end, (b) reducing an extent of the loss of the signal over a distance of the propagation, (c) using a second Raman radiation propagating in a first direction of propagation of the first Raman radiation, (d) using the second Raman radiation propagating in a second direction opposite to the first direction of propagation of the first Raman radiation, (e) any combination of (a) (b) and (c), or (f) any combination of (a) (b) and (d).

6. The method of claim 5, wherein the second degree of loss is lower at least in part by (a) generating the maximum increase in the power of the signal higher than the first degree of loss, the maximum increase being at the signal propagation distance in the hollow fiber from the first end, (b) reducing an extent of the loss of the signal over the distance of the propagation, and (c) using the second Raman radiation propagating in the second direction opposite to the first direction of propagation of the first Raman radiation.

7. The method of claim 5, wherein the second degree of loss is lower at least in part by (a) generating the maximum increase in the power of the signal higher than the first degree of loss, the maximum increase being at the signal propagation distance in the hollow fiber from the first end, (b) reducing an extent of the loss of the signal over the distance of the propagation, and (d) using the second Raman radiation propagating in the second direction opposite to the direction of propagation of the first Raman radiation.

8. The method of claim 1, wherein (A) the media is a gaseous media comprising at least one type of molecule present in an ambient atmosphere external to the hollow fiber (B) the media comprises dry air, nitrogen, oxygen, or carbon dioxide, or (C) any combination of (A) and (B).

9. The method of claim 1, wherein the first laser beam is generated by a first laser; wherein the second laser beam is generated by a second laser; and wherein the first laser and/or the second laser: (I) has a power of at least about 100 milli-Watts, (II) has a power of at most about 20 Watts, or (III) a combination of (I) and (II).

10. The method of claim 1, wherein the hollow fiber is configured to (I) have an attenuation of the signal of most about 0.5 decibels (dB) per kilometer, (II) transmit a power cross section of at least about 6 Giga Watts per square centimeter, or (III) a combination of (I) and (II).

11. The method of claim 1, wherein amplifying a power of the second laser beam at least by the Raman radiation (I) is of at least about 5% of the signal entering the hollow fiber, (II) allows increasing a propagation distance of the signal in at least a portion of the hollow fiber by at least about 500 Kilometers, the at least the portion of the hollow fiber being devoid of repeaters, the signal at an end of the propagation distance being demodulate, or (III) a combination of (I) and (II).

12. The method of claim 1, further comprising reducing a level of an external loss as compared to (a) propagating the signal through the hollow fiber without use of the first laser beam inducing the Raman radiation, (b) propagating the signal through a solid core fiber, or (c) a combination of (a) and (b).

13. The method of claim 1, wherein an enhancer is configured to operatively couple with a signal transmission fiber to enhance the signal entering the signal transmission fiber, the enhancer comprising an optical fiber; and wherein as compared to the enhancer, (A) a first power density of the second laser beam propagating in the optical fiber of the enhancer is less than a respective second power density of the second laser beam propagating through the hollow fiber utilized for the optical signal communication, (B) at least one fundamental length scale (FLS) of the optical fiber of the enhancer is smaller than a respective at least one FLS of the hollow fiber utilized for the optical signal communication, or (C) a combination of (A) and (B).

14. The method of claim 13, wherein as compared to the enhancer, the first power density of the second laser beam propagating in the optical fiber of the enhancer is less than the respective second power density of the second laser beam propagating through the hollow fiber utilized for the optical signal communication.

15. The method of claim 13, wherein the at least one FLS of the optical fiber of the enhancer is smaller than the respective at least one FLS of the hollow fiber utilized for the optical signal communication.

16. The method of claim 15, wherein the at least one FLS comprises a length or a width.

17. A device for the optical signal communication, the device comprising: one or more components configured to execute (b) and (c) of the method of claim 1, the device comprising the hollow fiber; a first laser configured to generate the first laser beam; a second laser configured to generate the second laser beam; and a modulator configured to modulate the second laser beam.

18. The device of claim 17, further comprising communicating the signal by a communication system comprising the hollow fiber, the communication system being devoid of an enhancer configured to (A) (i) amplify the signal and (ii) operatively couple to the hollow fiber, the enhancer being discrete (B) operatively couple with the hollow fiber, the enhancer being configured to amplify the signal locally with respect to the signal transmission path, or (C) a combination of (A) and (B).

19. The device of claim 17, wherein an enhancer is configured to operatively couple with a signal transmission fiber to enhance the signal entering the signal transmission fiber, the enhancer comprising an optical fiber; and wherein as compared to the enhancer, (A) a first power density of the second laser beam propagating in the optical fiber of the enhancer is less than a respective second power density of the second laser beam propagating through the hollow fiber utilized for the optical signal communication, (B) at least one fundamental length scale (FLS) of the optical fiber of the enhancer is smaller than a respective at least one FLS of the hollow fiber utilized for the optical signal communication, or (C) a combination of (A) and (B), the at least one FLS comprising a length or a width.

20. The device of claim 17, wherein (A) the media is a gaseous media comprising at least one type of molecule present in an ambient atmosphere external to the hollow fiber and/or (B) the media comprises dry air, nitrogen, oxygen, or carbon dioxide.

21. The device of claim 17, wherein (i) the first laser, (ii) the second laser or (ii) the first laser and the second laser: (I) has a power of at least about 100 milli-Watts, (II) has a power of at most about 20 Watts, or (III) a combination of (I) and (II).

22. The device of claim 17, wherein the hollow fiber is configured to (I) have an attenuation of the signal of most about 0.5 decibels (dB) per kilometer, (II) transmit a power cross section of at least about 6 Giga Watts per square centimeter, or (III) a combination of (I) and (II).

23. An apparatus for optical signal communication, the apparatus comprising: at least one controller configured to operatively couple with a first laser, a second laser, and a modulator, each of the first laser, the second laser and the modulator being operatively coupled with a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for the optical signal communication comprising transmission of a signal through the hollow fiber from the first end to the second end forming a signal transmission path, the signal transmission path substantially spanning a distance of the optical signal communication comprising long haul communication or short haul communication, the signal comprising electromagnetic radiation, the at least one controller being configured to connect (i) with a power source and/or (ii) with another communication platform, the at least one controller being configured to (a) direct the first laser to transmit a first laser beam into the hollow fiber to excite at least one member of the media members such that the at least one member excited by the first laser beam emits Raman radiation upon relaxation, the Raman radiation having a wavelength, (b) direct the second laser to generate a second laser beam, (c) direct the modulator to modulate the second laser beam to carry the signal utilized for the optical signal communication, and (d) direct transmission of the second laser beam carrying the signal through the hollow fiber along the signal transmission path, a gain of the second laser beam carrying the signal being increased by the Raman radiation having the wavelength, the gain of the second laser beam being increased along the signal transmission path during propagation of the second laser beam through the hollow fiber.

24. The apparatus of claim 23, wherein the Raman radiation is a first Raman radiation; wherein the second laser beam devoid of enhancement by Raman radiation experiences a first degree of loss as it propagates in the hollow fiber; and wherein the at least one controller is configured to direct one or more components such that the first Raman radiation to enhance the signal at least in part by generating a second degree of loss of the signal that is lower than the first degree of loss, the second degree of loss being lower at least in part by (i) generating a maximum increase in a power of the signal higher than the first degree of loss, the maximum increase being at a signal propagation distance in the hollow fiber from the first end, (ii) reducing an extent of the loss of the signal over a distance of the propagation, (iii) using a second Raman radiation propagating in a first direction of propagation of the first Raman radiation, (iv) using the second Raman radiation propagating in a second direction opposite to the first direction of propagation of the first Raman radiation, (v) any combination of (i) (ii) and (iii), or (vi) any combination of (i) (ii) and (iv).

25. The apparatus of claim 23, wherein the at least one controller is configure to direct one or more components such that amplification of a power of the second laser beam at least by the Raman radiation (I) being of at least about 5% of the signal entering the hollow fiber, (II) allowing increase of a propagation distance of the signal in at least a portion of the hollow fiber by at least about 500 Kilometers, the at least the portion of the hollow fiber being devoid of repeaters, the signal at an end of the propagation distance being demodulated, or (III) a combination of (I) and (II).

26. The apparatus of claim 23, wherein the at least one controller is further configured to direct one or more components such that such that reduction of a level of an external loss as compared to (a) propagating the signal through the hollow fiber without use of the first laser beam inducing the Raman radiation, (b) propagating the signal through a solid core fiber, or (c) a combination of (a) and (b).

27. One or more non-transitory computer readable media comprising program instructions physically inscribed thereon, the program instructions, when read by one or more processors operatively coupled with a first laser, a second laser, and a modulator, the one or more processors are configured to execute, or direct execution of, operations, each of the first laser, the second laser and the modulator being operatively coupled with a hollow fiber comprising a media disposed in at least a portion of a hollow space of the hollow fiber, the media comprising media members, the media members being dispersed, the media members comprising molecules or atoms, the hollow fiber having a first end and a second end opposing the first end, the hollow fiber being configured for optical signal communication comprising transmission of a signal through the hollow fiber from the first end to the second end forming a signal transmission path, the signal transmission path substantially spanning a distance of the optical signal communication comprising long haul communication or short haul communication, the signal comprising electromagnetic radiation, the operations comprising (a) directing the first laser to transmit a first laser beam into the hollow fiber to excite at least one member of the media members such that the at least one member excited by the first laser beam emits Raman radiation upon relaxation, the Raman radiation having a wavelength, (b) directing the second laser to generate a second laser beam, (c) directing the modulator to modulate the second laser beam to carry the signal utilized for the optical signal communication, and (d) directing transmission of the second laser beam carrying the signal through the hollow fiber along the signal transmission path, a gain of the second laser beam carrying the signal being increased by the Raman radiation having the wavelength, the gain of the second laser beam being increased along the signal transmission path during propagation of the second laser beam through the hollow fiber.

28. The One or more non-transitory computer readable media of claim 27, wherein the Raman radiation is a first Raman radiation; wherein the second laser beam devoid of enhancement by Raman radiation experiences a first degree of loss as it propagates in the hollow fiber; and wherein the one or more processors are configured to execute, or direct execution of, any of one or more operations such that such that the first Raman radiation to enhance the signal at least in part by generating a second degree of loss of the signal that is lower than the first degree of loss, the second degree of loss being lower at least in part by (i) generating a maximum increase in a power of the signal higher than the first degree of loss, the maximum increase being at a signal propagation distance in the hollow fiber from the first end, (ii) reducing an extent of the loss of the signal over a distance of the propagation, (iii) using a second Raman radiation propagating in a first direction of propagation of the first Raman radiation, (iv) using the second Raman radiation propagating in a second direction opposite to the first direction of propagation of the first Raman radiation, (v) any combination of (i) (ii) and (iii), or (vi) any combination of (i) (ii) and (iv).

29. The One or more non-transitory computer readable media of claim 27, wherein the one or more processors are configured to execute, or direct execution of, one or more operations such that such amplification of a power of the second laser beam at least by the Raman radiation (I) being of at least about 5% of the signal entering the hollow fiber, (II) allowing increase of a propagation distance of the signal in at least a portion of the hollow fiber by at least about 500 Kilometers, the at least the portion of the hollow fiber being devoid of repeaters, the signal at an end of the propagation distance being demodulated, or (III) a combination of (I) and (II).

30. The One or more non-transitory computer readable media of claim 27, wherein the one or more processors are configured to execute, or direct execution of, one or more operations such that such that reduction of a level of an external loss as compared to (a) propagating the signal through the hollow fiber without use of the first laser beam inducing the Raman radiation, (b) propagating the signal through a solid core fiber, or (c) a combination of (a) and (b).

\* \* \* \* \*